US011912038B2

(12) United States Patent
Ishibe

(10) Patent No.: US 11,912,038 B2
(45) Date of Patent: Feb. 27, 2024

(54) LIQUID CARTRIDGE INCLUDING CIRCUIT BOARD POSITIONED BETWEEN FIRST PROTRUSION AND SECOND PROTRUSION PROVIDED ON TOP WALL OF HOUSING

(71) Applicant: BROTHER KOGYO KABUSHIKI KAISHA, Nagoya (JP)

(72) Inventor: Akinari Ishibe, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/752,991

(22) Filed: May 25, 2022

(65) Prior Publication Data

US 2023/0001702 A1 Jan. 5, 2023

Related U.S. Application Data

(63) Continuation of application No. 17/007,036, filed on Aug. 31, 2020, now Pat. No. 11,364,723, which is a (Continued)

(30) Foreign Application Priority Data

Mar. 31, 2020 (JP) ................................ 2020-063127

(51) Int. Cl.
*B41J 2/175* (2006.01)

(52) U.S. Cl.
CPC ......... *B41J 2/17536* (2013.01); *B41J 2/1752* (2013.01); *B41J 2/17513* (2013.01); *B41J 2/17553* (2013.01)

(58) Field of Classification Search
CPC .. B41J 2/17536; B41J 2/17513; B41J 2/1752; B41J 2/17553; B41J 2/1753; B41J 2/17523; B41J 2/17546
(Continued)

(56) References Cited

U.S. PATENT DOCUMENTS

2011/0096127 A1* 4/2011 Ishibe .................... B41J 2/1752 347/85
2016/0279959 A1* 9/2016 Okazaki ................ B41J 2/1752
(Continued)

FOREIGN PATENT DOCUMENTS

EP 3 437 879 A1 2/2019
EP 3 546 222 A1 10/2019
(Continued)

OTHER PUBLICATIONS

Written Opinion issued in corresponding Singapore patent application No. 11202009653S, dated Sep. 26, 2022
(Continued)

*Primary Examiner* — Matthew Luu
*Assistant Examiner* — Alexander D Shenderov
(74) *Attorney, Agent, or Firm* — Merchant & Gould P.C.

(57) ABSTRACT

A liquid cartridge includes: a housing including first and second protrusions; and a circuit board including an electrode. The first protrusion is positioned rearward but the second protrusion is positioned forward relative to the circuit board. When viewed in a width direction crossing a gravitational direction, an outline of the liquid cartridge between a first point and a second point is lower than an imaginary line. The imaginary line passes through the first point on the first protrusion and the second point on the second protrusion. A distance between a front edge of the electrode and the first point is smaller than a distance between the front edge and the second point. A dimension between a front end and a rear end of the second protrusion is greater than a distance between a frontmost end of the housing and the front end of the second protrusion.

17 Claims, 10 Drawing Sheets

Related U.S. Application Data continuation-in-part of application No. PCT/JP2020/015314, filed on Apr. 3, 2020.

(58) Field of Classification Search
USPC ........................................................ 347/86
See application file for complete search history.

(56) References Cited

U.S. PATENT DOCUMENTS

| | | | |
|---|---|---|---|
| 2016/0288512 | A1 | 10/2016 | Koizumi et al. |
| 2017/0066248 | A1* | 3/2017 | Ono ...................... B41J 2/1753 |
| 2017/0277117 | A1 | 9/2017 | Taguchi et al. |
| 2018/0178527 | A1* | 6/2018 | Miyao .................... B41J 2/1753 |
| 2018/0178528 | A1 | 6/2018 | Nakazawa et al. |
| 2018/0178534 | A1 | 6/2018 | Nukui et al. |
| 2018/0178535 | A1 | 6/2018 | Tomoguchi |
| 2018/0272721 | A1 | 9/2018 | Ono |
| 2019/0100015 | A1 | 4/2019 | Miyao et al. |
| 2019/0299634 | A1 | 10/2019 | Takahashi et al. |
| 2019/0299635 | A1 | 10/2019 | Ono et al. |
| 2020/0031132 | A1 | 1/2020 | Ono et al. |

FOREIGN PATENT DOCUMENTS

| | | | |
|---|---|---|---|
| EP | 3 616 922 | A1 | 3/2020 |
| JP | 2001-106278 | A | 4/2001 |
| JP | 2016-185648 | A | 10/2016 |
| JP | 2016-187872 | A | 11/2016 |
| JP | 2017-052120 | A | 3/2017 |
| JP | 2017-52219 | A | 3/2017 |
| JP | 2017-181527 | A | 10/2017 |
| JP | 2018-103566 | A | 7/2018 |
| JP | 2018-103593 | A | 7/2018 |
| JP | 2018-108650 | A | 7/2018 |
| JP | 2019-64046 | A | 4/2019 |
| JP | 2019-171735 | A | 10/2019 |
| JP | 2019-171736 | A | 10/2019 |
| JP | 2020-19154 | A | 2/2020 |

OTHER PUBLICATIONS

International Search Report and Written Opinion issued in corresponding International Patent Application No. PCT/JP2020/015314, dated Jun. 23, 2020.

Office Action issued in corresponding Canadian Patent Application No. 3,094,211, dated Oct. 25, 2021.

Examination Report issued in corresponding Australian Patent Application No. 2020239713, dated Sep. 9, 2021.

Written Opinion issued in corresponding Singaporean Patent Application No. 11202009653S, dated May 21, 2021.

Extended European Search Report issued in corresponding European Patent Application No. 20193584.8, dated Feb. 15, 2021.

Office Action issued in corresponding Japanese application No. 2020-063127, dated Nov. 14, 2023.

* cited by examiner

LIQUID CARTRIDGE INCLUDING CIRCUIT BOARD POSITIONED BETWEEN FIRST PROTRUSION AND SECOND PROTRUSION PROVIDED ON TOP WALL OF HOUSING

CROSS REFERENCE TO RELATED APPLICATION

This application is a continuation of U.S. patent application Ser. No. 17/007,036 filed Aug. 31, 2020, now U.S. Pat. No. 11,364,723, which is a continuation-in-part of International Application No. PCT/JP2020/015314 filed Apr. 3, 2020 claiming priority from Japanese Patent Application No. 2020-063127 filed Mar. 31, 2020. The entire contents of the International Application and the priority application are incorporated herein by reference.

TECHNICAL FIELD

The present disclosure relates to a liquid cartridge including: a housing having a liquid chamber therein; and a liquid supply portion for supplying liquid stored in the liquid chamber to an outside thereof.

BACKGROUND

There has been known a printer including a recording head for ejecting, through nozzles, ink supplied from an ink cartridge (for example, refer to Japanese Patent Application Publication No. 2019-64046). In this kind of printer, a new ink cartridge is to be mounted once the ink in the liquid cartridge is used up. The ink cartridge includes a housing having an ink chamber therein, and a light-blocking plate. The light-blocking plate is provided at a top surface of the housing, and is configured to block or attenuate light emitted in a left-right direction.

SUMMARY

In a case where a circuit board provided on the ink cartridge gets damaged when the ink cartridge is dropped and is collided with a flat surface such as a floor, there is likelihood that the circuit board cannot provide communication, thereby hindering use of the ink cartridge.

In view of the foregoing, it is an object of the present disclosure to provide a liquid cartridge in which damage to a circuit board can be suppressed even if the liquid cartridge is collided with a flat surface.

In order to attain the above and other object, according to one aspect, the present disclosure provides a liquid cartridge including: a housing; a circuit board; and a liquid supply portion. The housing defines a liquid storage chamber therein. The housing includes a plurality of walls defining an outline of the liquid cartridge when viewed in a width direction crossing a gravitational direction. The plurality of walls includes: a pair of side walls; a front wall; a rear wall; a top wall; and a bottom wall. The pair of side walls is spaced away from each other in the width direction. The front wall has a frontmost point in a depth direction perpendicular to the width direction and the gravitational direction. The rear wall is spaced away from the front wall in the depth direction. The rear wall has a rearmost point in the depth direction. The bottom wall is spaced away from the top wall in a height direction perpendicular to the width direction and the depth direction. The circuit board is provided at the top wall and including an electrode having a front edge. The liquid supply portion is provided at the housing and has a liquid passage extending in the depth direction from the liquid storage chamber. The housing further includes: a first protrusion; and a second protrusion. The first protrusion is positioned rearward of the circuit board in the depth direction and protrudes upward from the top wall. The second protrusion is positioned forward of the circuit board in the depth direction and protrudes upward from the top wall. The second protrusion extends in the depth direction and has a front end and a rear end in the depth direction. When viewed in the width direction, the outline of the liquid cartridge is positioned lower than an imaginary line in a region in the depth direction between a first point defined on the outline of the first protrusion and a second point defined on the outline of the second protrusion. The imaginary line passes through each of the first point of the first protrusion and the second point of the second protrusion. The first protrusion and the second protrusion are below the imaginary line. The front edge of the electrode and the first point provide a distance in the depth direction therebetween that is smaller than a distance in the depth direction between the front edge of the electrode and the second point. The second protrusion has a dimension in the depth direction between the front end and the rear end thereof that is greater than a distance in the depth direction between the frontmost point of the housing and the front end of the second protrusion.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Figure 1:
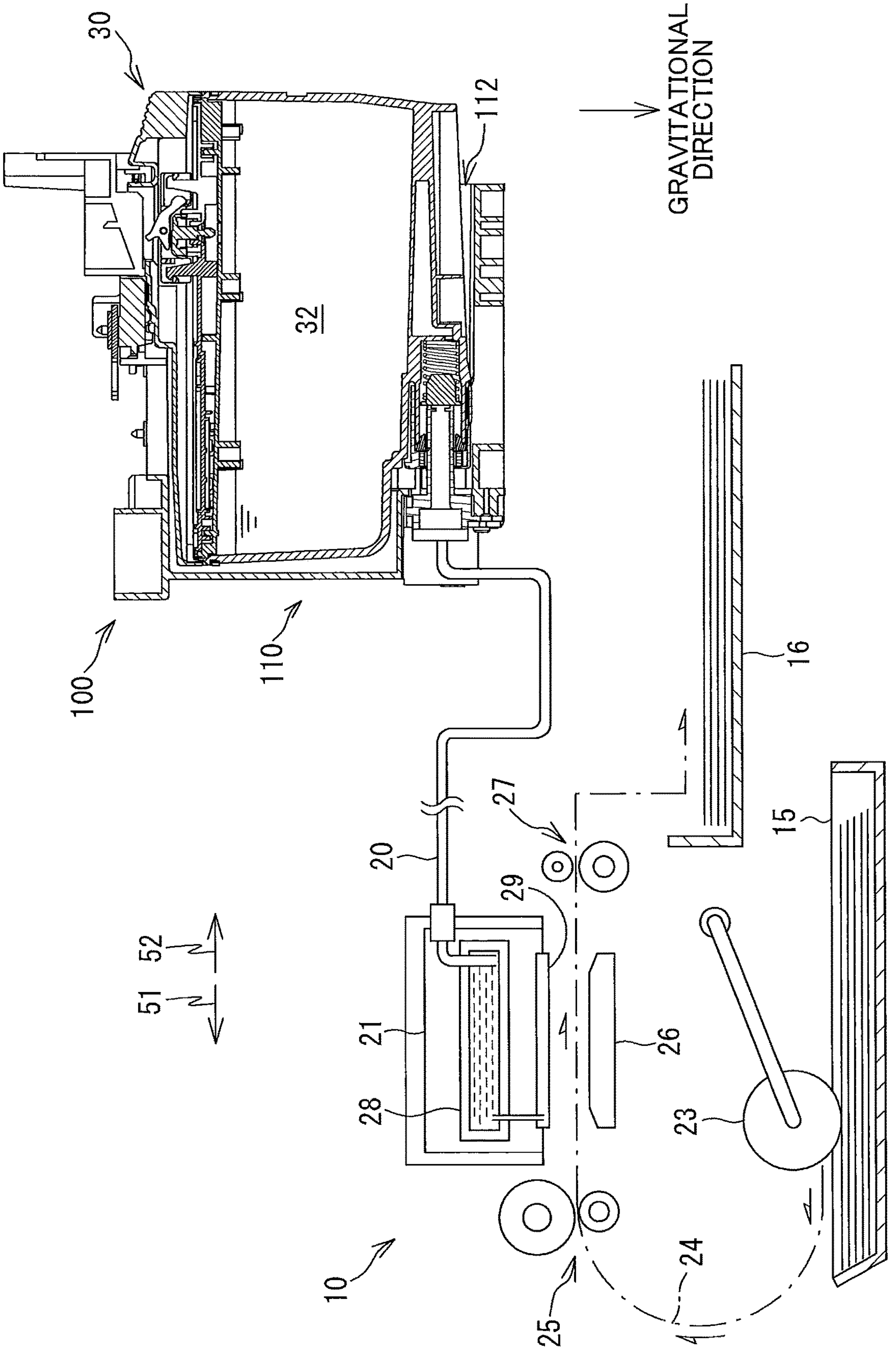
FIG. 1 is a vertical cross-sectional view schematically illustrating an internal configuration of a printer 10 to which a liquid cartridge according to one embodiment of the present disclosure is attached.

Hereinafter, an embodiment of the disclosure will be described with reference to accompanying drawings. It would be apparent to those skilled in the art that the embodiment described below is merely an example of the present disclosure and modifications and variations may be made therein without departing from the scope of the disclosure.

In the following description, a frontward direction 51 is defined as a direction in which an ink cartridge 30 is inserted into a cartridge-attachment section 110. A rearward direction 52 is defined as a direction in which the ink cartridge 30 is extracted from the cartridge-attachment section 110. In the following example, the ink cartridge 30 is inserted and extracted horizontally relative to the cartridge-attachment section 110. Hence, description will be made assuming that the frontward direction 51 and the rearward direction 52 are horizontal, but the frontward direction 51 and the rearward direction 52 may not be horizontal. Further, a downward direction 53 is defined as a direction perpendicular to the frontward direction 51 or the rearward direction 52. An upward direction 54 is defined as a direction opposite the downward direction 53. Further, a rightward direction 55 is defined as a direction perpendicular to the frontward direction 51 and the downward direction 53. A leftward direction 56 is defined as a direction opposite the rightward direction 55. Accordingly, in a state where the ink cartridge 30 is attached to the cartridge-attachment section 110 and is used therewith, the downward direction 53 coincides with the gravitational direction and the upward direction 54 is opposite the gravitational direction. That is, in the state where the ink cartridge 30 is attached to the cartridge-attachment section 110 and is used therewith, an outer surface of a main bottom wall 42 of a housing 130 faces downward in the gravitational direction. Further, the rightward direction 55 and the leftward direction 56 are defined as directions perpendicular to the frontward direction 51 and the downward direction 53. More specifically, in the state where the ink cartridge 30 is attached to the cartridge-attachment section 110 and is used therewith, the rightward direction 55 is a direction toward the right and the leftward direction 56 is a direction toward the left when the ink cartridge 30 is viewed from a rear side thereof. Note that a state where the ink cartridge 30 is attached to the cartridge-attachment section 110 and is used therewith implies a state where the ink cartridge 30 has been completely inserted into an attached position in the cartridge-attachment section 110. At the attached position of the ink cartridge 30, an ink supply tube 102 of the cartridge-attachment section 110 is inserted in an ink supply portion 34 of the ink cartridge 30 and is connected thereto. Further, hereinafter, a posture of the ink cartridge 30 in a state where the ink cartridge 30 is attached to the cartridge-attachment section 110 and is used thereby will be referred to as an "operable posture."

Further, in the following description, the frontward direction 51 and the rearward direction 52 may be collectively referred to as a front-rear direction. The upward direction 54 and the downward direction 53 may be collectively referred to as an up-down direction. The rightward direction 55 and the leftward direction 56 may be collectively referred to as a left-right direction.

In the following description, "facing frontward" includes facing in a direction including a frontward component, and "facing rearward" includes facing in a direction including a rearward component. Further, "facing downward" includes facing in a direction including a downward component, and "facing upward" includes facing in a direction including an upward component. For example, "a front surface faces frontward" denotes that the front surface may face in a frontward direction, or the front surface may face in a direction inclined relative to the frontward direction.

[Overview of Printer 10]

As illustrated in FIG. 1, a printer 10 is an image-recording apparatus configured to record an image by selectively ejecting ink droplets onto a sheet based on an inkjet recording system. For example, the printer 10 is an inkjet printer. The printer 10 includes a recording head 21, an ink-supplying device 100, and an ink tube 20 connecting the recording head 21 to the ink-supplying device 100. The ink-supplying device 100 includes the cartridge-attachment section 110. To the cartridge-attachment section 110, the ink cartridge 30 is attachable. The cartridge-attachment section 110 has a surface formed with an opening 112. The ink cartridge 30 is inserted forward into the cartridge-attachment section 110 through the opening 112, and extracted rearward from the cartridge-attachment section 110 through the opening 112.

The ink cartridge 30 stores ink therein. For example, the ink cartridge 30 stores ink that the printer 10 can use for printing. In a state where the ink cartridge 30 has been completely attached to the cartridge-attachment section 110, the ink cartridge 30 and the recording head 21 are connected to each other through the ink tube 20. The recording head 21 includes a damper chamber 28 for temporarily storing ink supplied through the ink tube 20. The recording head 21 is configured to eject the ink supplied from the damper chamber 28 through a plurality of nozzles 29. More specifically, a head control board provided in the recording head 21 is configured to selectively apply drive voltages to piezoelectric elements provided in correspondence with the plurality of nozzles 29. Thus, ink can be ejected selectively through the nozzles 29. That is, the recording head 21 is configured to consume the ink stored in the ink cartridge 30 attached to the cartridge-attachment section 110.

The printer 10 includes a sheet tray 15, a sheet feeding roller 23, a conveying roller pair 25, a platen 26, a discharge roller pair 27, and a sheet discharge tray 16. The sheet feeding roller 23 is configured to convey a sheet in the sheet tray 15 toward a conveying path 24. The sheet conveyed onto the conveying path 24 reaches the conveying roller pair 25. The conveying roller pair 25 is configured to convey the arrived sheet onto the platen 26. The recording head 21 is configured to selectively eject ink onto the sheet that is moving over the platen 26, thereby recording an image on the sheet. The sheet that have passed the platen 26 then arrives at the discharge roller pair 27. The discharge roller pair 27 is configured to discharge the arrived sheet onto the sheet discharge tray 16 that is disposed at a downstream end of the conveying path 24.

[Ink-Supplying Device 100]

The printer 10 includes the ink-supplying device 100, as illustrated in FIG. 1. The ink-supplying device 100 is configured to supply ink to the recording head 21. As described above, the ink-supplying device 100 includes the cartridge-attachment section 110 to which the ink cartridge 30 is attachable. Incidentally, FIG. 1 depicts a state where attachment of the ink cartridge 30 to the cartridge-attachment section 110 is completed. In other words, in FIG. 1, the ink cartridge 30 is in an attached state. A posture of the ink cartridge 30 in this state is the operable posture.

[Cartridge-Attachment Section 110]

Figure 2:
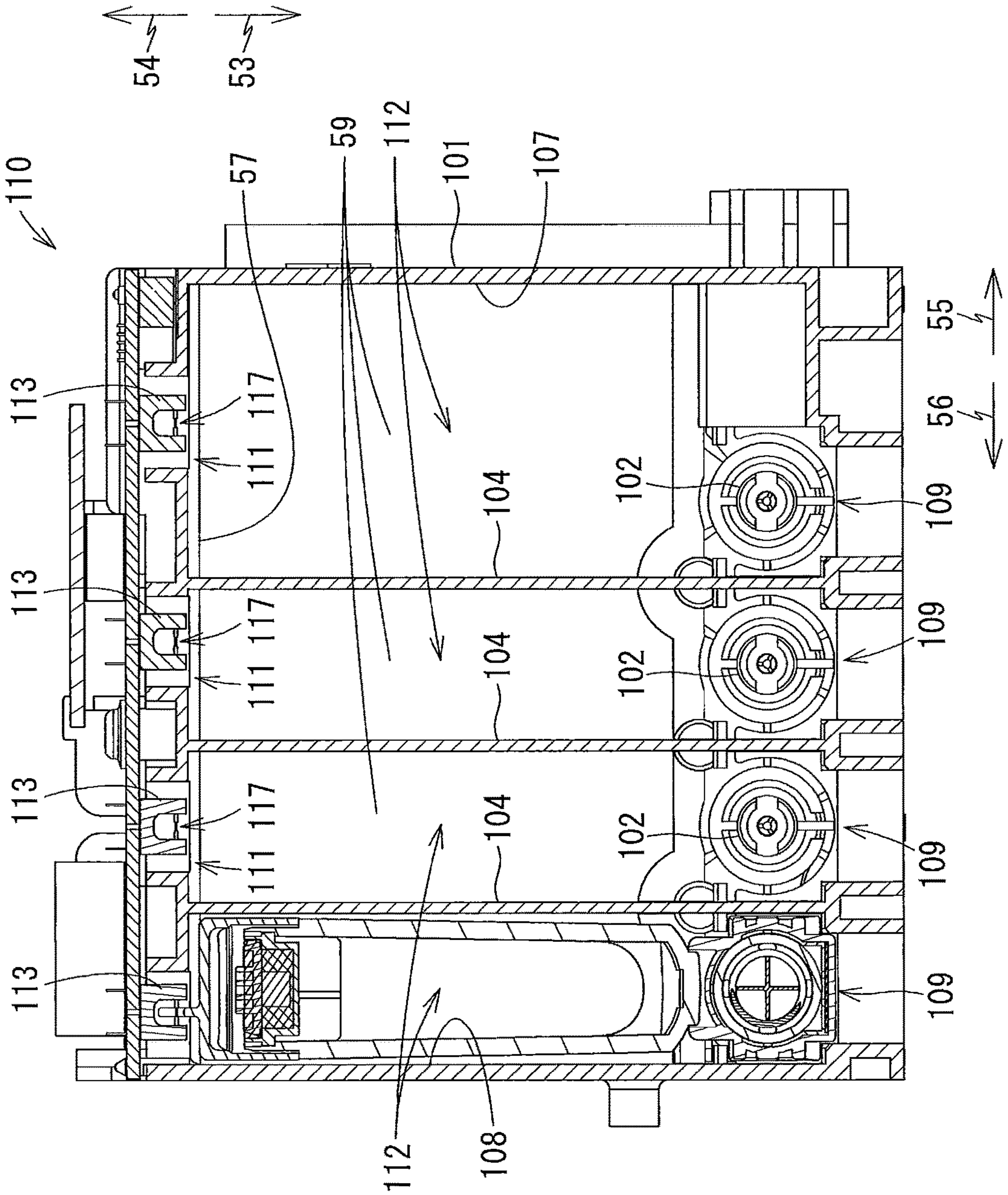
FIG. 2 is a horizontal cross-sectional view of a cartridge-attachment section 110 of the printer 10.
Figure 3:
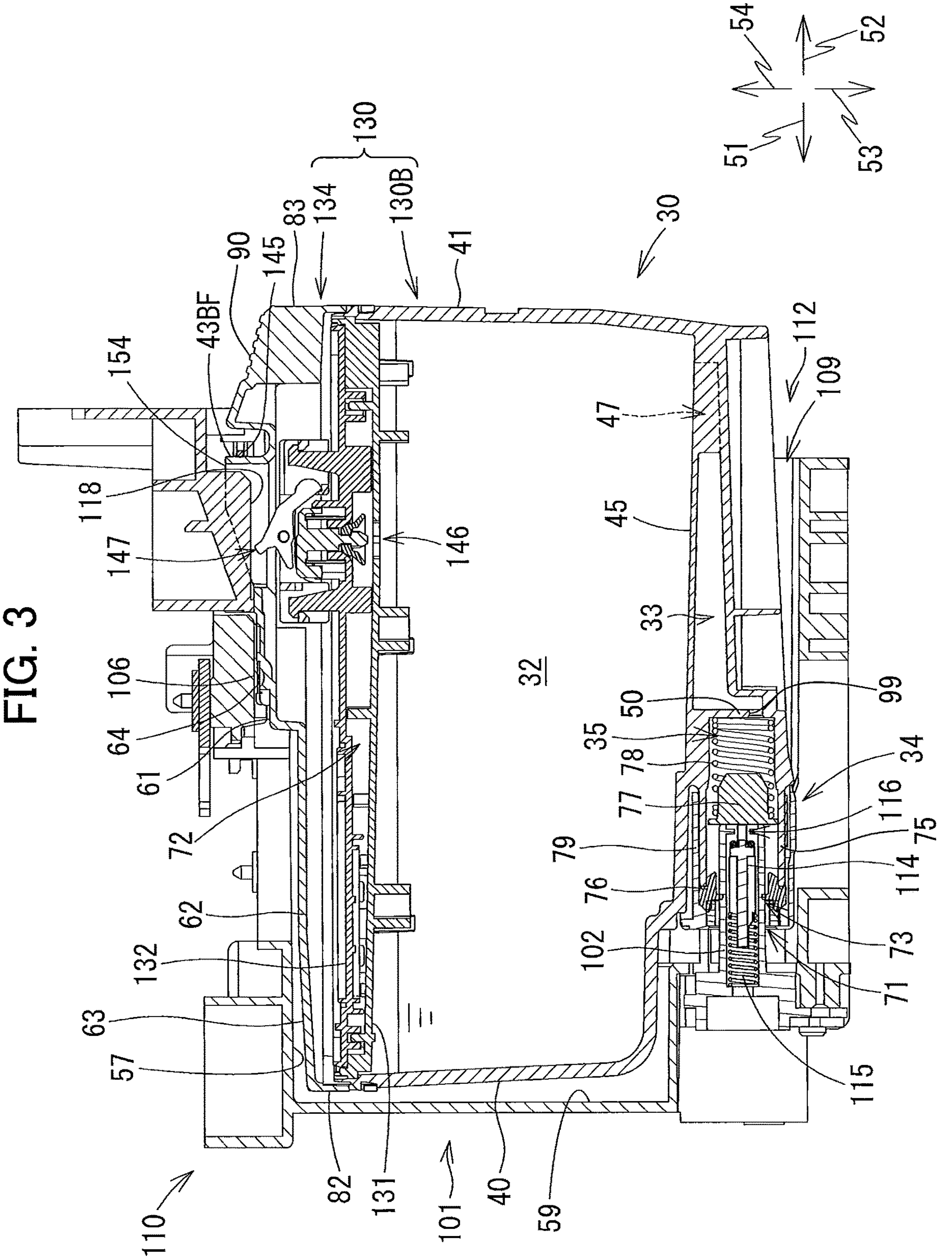
FIG. 3 is a vertical cross-sectional view illustrating a state where the ink cartridge 30 according to the embodiment is attached to the cartridge-attachment section 110.

As illustrated in FIGS. 1 through 3, the ink-supplying device 100 includes a cartridge case 101, and the ink supply tube 102. In the cartridge-attachment section 110, four kinds of the ink cartridges 30 corresponding to respective colors of cyan, magenta, yellow and black can be accommodated.

Further, four of the ink supply tubes 102 are provided in correspondence with the four kinds of ink cartridges 30.

[Cartridge Case 101]

As depicted in FIG. 2, the cartridge case 101 constitutes a housing of the cartridge-attachment section 110. The cartridge case 101 is in a shape of a box and has a top surface 57, a bottom surface, a right side surface 107, a left side surface 108, an end surface 59, and the opening 112. The top surface 57 defines a ceiling which is an upper end of an internal space of the cartridge case 101. The bottom surface defines a bottom which is a lower end of the internal space of the cartridge case 101. The right side surface 107 defines a right edge of the internal space of the cartridge case 101. The left side surface 108 defines a left edge of the internal space of the cartridge case 101. The end surface 59 is connected to the top surface 57, the bottom surface, the right side surface 107 and the left side surface 108. The opening 112 is formed to oppose the end surface 59 in the front-rear direction in the cartridge case 101. The opening 112 can be exposed to a user-interface surface which is a surface that a user can face when using the printer 10.

The ink cartridge 30 is insertable into the cartridge case 101 through the opening 112, and is removable from the cartridge case 101 through the opening 112. In a bottom portion of the cartridge case 101, guide grooves 109 are formed. By a lower end of the ink cartridge 30 being inserted in the guide groove 109, the ink cartridge 30 is guided by the guide groove 109 in the front-rear direction (a direction orthogonal to a sheet surface of FIG. 2). The cartridge case 101 also includes three plates 104 that partition the internal space into four different spaces elongated in the up-down direction. In each of the four spaces partitioned by the plates 104, one ink cartridge 30 is accommodated.

[Ink Supply Tube 102]

As illustrated in FIGS. 2 and 3, the ink supply tube 102 is hollow cylindrical shaped, and is disposed at a lower end portion of the end surface 59 of the cartridge case 101. The ink supply tube 102 is disposed at a position corresponding to the ink supply portion 34 of the ink cartridge 30 attached to the cartridge-attachment section 110. The ink supply tube 102 protrudes rearward from the end surface 59 of the cartridge case 101, and has a tip end that is open rearward (opening 116).

In an internal space of the ink supply tube 102, a tube valve 114 and a coil spring 115 are accommodated. In the internal space of the ink supply tube 102, the tube valve 114 is movable in the frontward direction 51 and the rearward direction 52 between an open position for opening the opening 116 and a closing position for closing the opening 116. The coil spring 115 urges the tube valve 114 in a direction for moving the tube valve 114 toward the closing position, i.e., in the rearward direction 52. At the closing position, a tip end (rear end) of the tube valve 114 protrudes further in the rearward direction 52 than the opening 116.

[Lock Shaft 145]

As illustrated in FIG. 3, a lock shaft 145 is provided at the cartridge case 101 at a position near the top surface 57 and the opening 112 to extend in the left-right direction. The lock shaft 145 is a bar-like member extending in the left-right direction. The lock shaft 145 is columnar-shaped metal, for example. The lock shaft 145 has both ends in the left-right direction that are fixed to respective walls defining left and right end portions of the cartridge case 101 in the left-right direction. Accordingly, the lock shaft 145 does not make any movement, such as pivoting, relative to the cartridge case 101. The lock shaft 145 extends across the four spaces in which four of the ink cartridges 30 can be respectively accommodated. In each of the four spaces for accommodating one ink cartridge 30, a space is provided around the lock shaft 145. Hence, the lock shaft 145 is accessible by, for example, a rear surface 43BF of the ink cartridge 30 that is moving upward or rearward.

The lock shaft 145 functions to retain the ink cartridge 30 attached to the cartridge-attachment section 110 at the attached position. By the ink cartridge 30 being inserted in the cartridge-attachment section 110 and pivoted into the operable posture, the lock shaft 145 is engaged with the rear surface 43BF of a rear protruding portion 43B (see FIG. 4). Further, the lock shaft 145 retains the ink cartridge 30 inside the cartridge-attachment section 110 against a pressing force of a coil spring 78 that pushes the ink cartridge 30 rearward.

As illustrated in FIG. 2, at the top surface 57 of the cartridge case 101, openings 111 are formed one for each of the four spaces partitioned by the plates 104. A gate 113 is exposed through a corresponding one of the openings 111. Each gate 113 has a slit 117 that is open downward and that extends in the front-rear direction. Left-right positions of the respective slits 117 of the gates 113 are different from one another depending on partitioning positions of the plates 104. The position of each slit 117 in each space coincides with a type of the ink cartridge 30 that is to be mounted in the space in the cartridge case 101. Accordingly, a rib 67 (see FIG. 4) of the ink cartridge 30 that is inserted into the correct space to which the ink cartridge 30 is to be attached in the cartridge case 101 can pass through the slit 117 of the gate 113 in the correct space. On the other hand, the rib 67 of the ink cartridge 30 that is inserted into a wrong space to which the ink cartridge 30 is not to be attached in the cartridge case 101 cannot pass through the slit 117 of the gate 113 in that wrong space.

[Overall Configuration of the Ink Cartridge 30]

Figure 4:
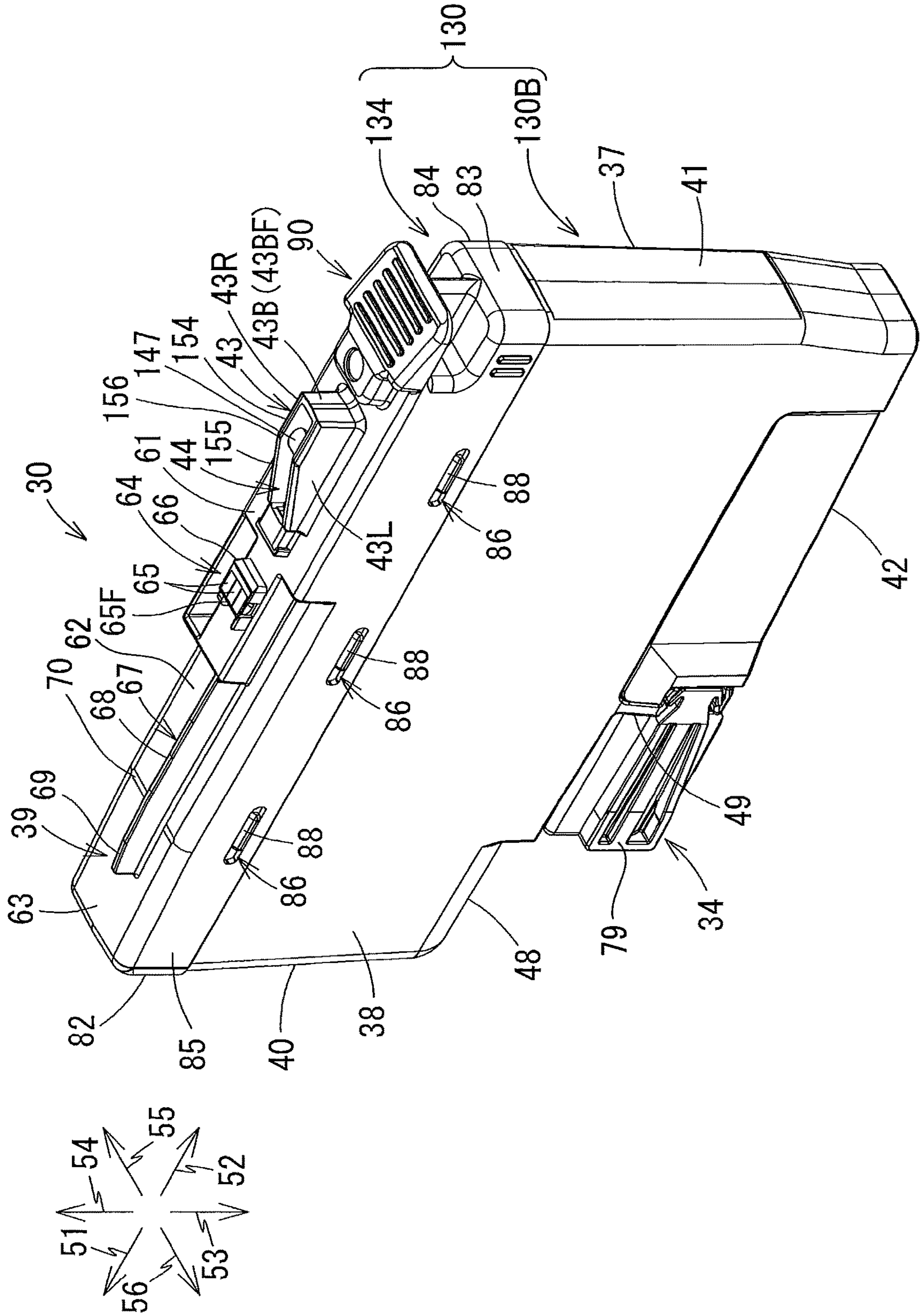
FIG. 4 is a rear perspective view of the ink cartridge 30 according to the embodiment.
Figure 8:
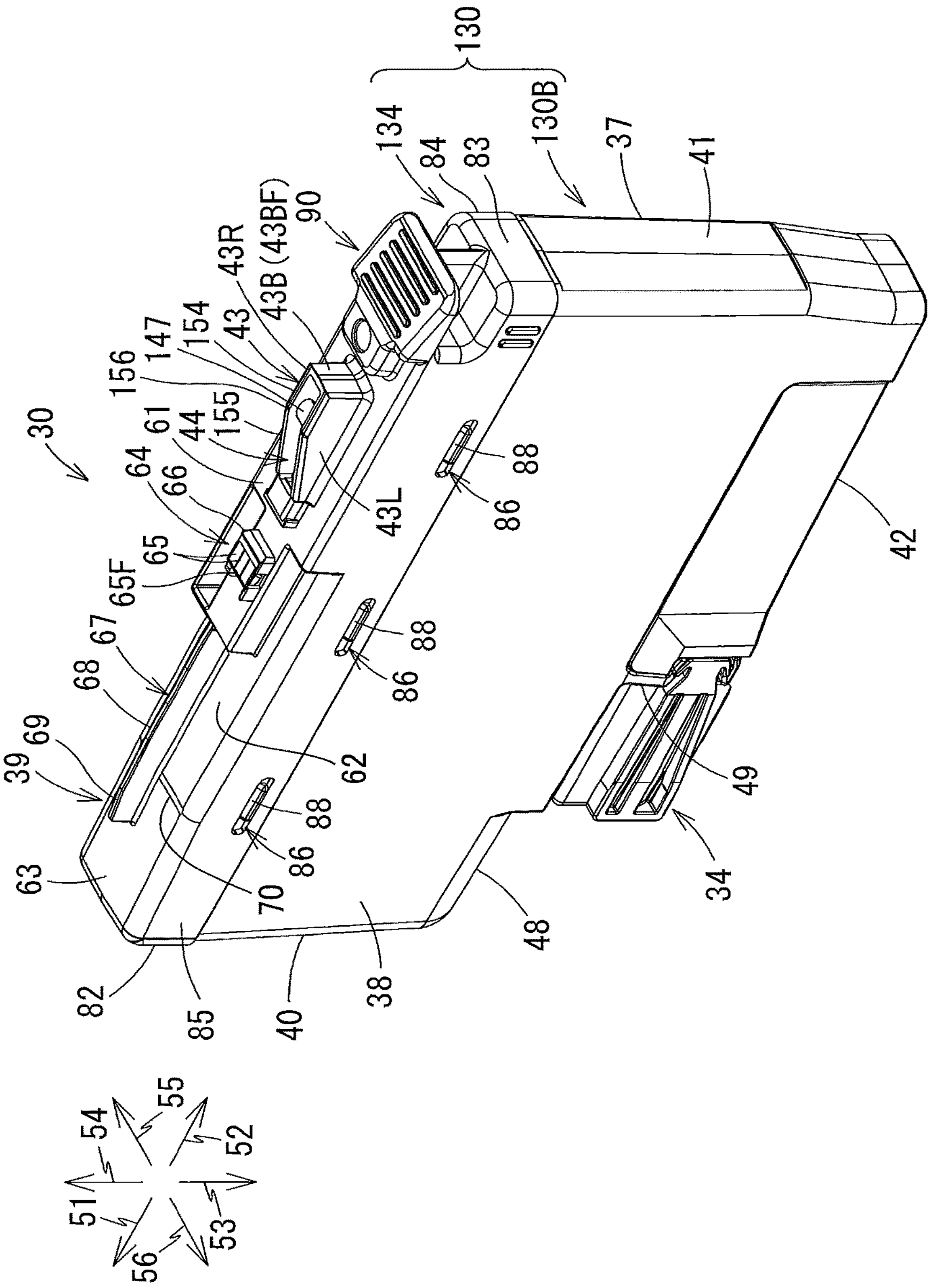
FIG. 8 is a rear perspective view of the ink cartridge 30 according to the embodiment having the rib 67 at a different left-right position.

The ink cartridge 30 is a container for storing ink as liquid. In the present embodiment, four of the ink cartridges 30 corresponding to respective colors of cyan, magenta, yellow and black can be attached to the cartridge-attachment section 110. Of the four ink cartridges 30, configurations of the three ink cartridges 30 corresponding to the colors of cyan, magenta and yellow are identical to one another, except the positions of the ribs 67 in the left-right direction, as illustrated in FIGS. 4 and 8. On the other hand, the ink cartridge 30 corresponding to the color of black has a structure different from those of the other three ink cartridges 30 in that the ink cartridge 30 for black has a larger left-right width than those of the three ink cartridges 30. Other than this point, the configuration of the ink cartridge 30 for black is generally identical to those of the other three ink cartridges 30, except the left-right position of the rib 67.

Hereinafter, a structure of the ink cartridge 30 corresponding to one of the colors of cyan, magenta and yellow will be described.

Figure 5:
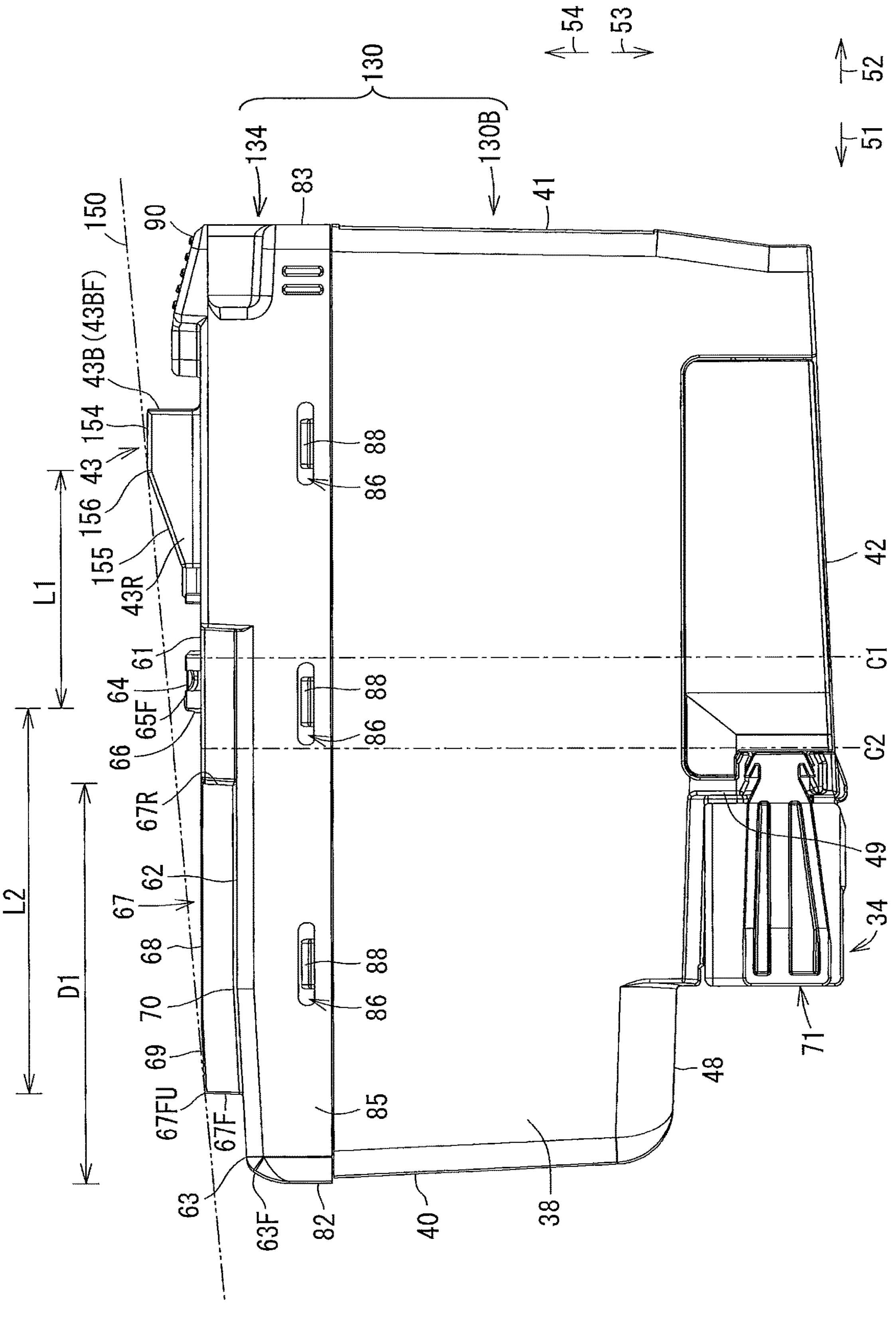
FIG. 5 is a side view of the ink cartridge 30 according to the embodiment.

The posture of the ink cartridge 30 depicted in FIGS. 4 and 5 is a posture in which the ink cartridge 30 can be used, i.e., the operable posture. Hereinafter, the posture of the ink cartridge 30 illustrated in FIGS. 4-5 will also be referred to as an upright posture, and description will be made assuming that the ink cartridge 30 is in its upright posture unless specified otherwise. That is, the upright posture of the ink cartridge 30 coincides with the operable posture of the ink cartridge 30 in which the ink cartridge 30 is attached to the cartridge-attachment section 110.

The ink cartridge 30 includes a lower base 130B, and an outer cover 134. The outer cover 134 is assembled to the lower base 130B to constitute the housing 130.

The housing 130 includes a front wall (front walls 40 and 82), a rear wall (rear walls 41 and 83), a top wall 39, and a bottom wall (bottom walls 42 and 48), and a pair of side walls (side walls 37, 84 and 38, 85).

The front wall of the housing 130 is a wall that faces frontward in the upright posture of the ink cartridge 30. The rear wall of the housing 130 is a wall that faces rearward in the upright posture of the ink cartridge 30. The top wall 39 of the housing 130 faces upward in the upright posture of the ink cartridge 30. The top wall 39 has a front end connected to an upper end of the front wall 82, and a rear end connected to an upper end of the rear wall 83.

The bottom wall of the housing 130 faces downward in the upright posture of the ink cartridge 30. The bottom wall has a front end connected to a lower end of the front wall 40, and a rear end connected to a lower end of the rear wall 41. In the present embodiment, the bottom wall of the housing 130 includes a step wall 49. In the present embodiment, the bottom wall includes a main bottom wall 42 and a sub bottom wall 48. In the bottom wall, the main bottom wall 42 is a wall connecting the lower end of the rear wall 41 to a lower end of the step wall 49. In the bottom wall, the sub bottom wall 48 is a wall connecting the lower end of the front wall 40 to an upper end of the step wall 49.

In the upright posture (operable posture) of the ink cartridge 30, a direction from the rear wall toward the front wall of the housing 130 is coincident with the frontward direction 51, and a direction from the front wall toward the rear wall of the housing 130 is coincident with the rearward direction 52. Further, in the upright posture (operable posture) of the ink cartridge 30, a direction from the top wall 39 toward the bottom wall of the housing 130 is coincident with the downward direction 53 (gravitational direction), and a direction from the bottom wall of the housing 130 to the top wall 39 is coincident with the upward direction 54. Further, in the upright posture (operable posture) of the ink cartridge 30, a direction from the side walls 38, 85 toward the side walls 37, 84 of the housing 130 is coincident with the rightward direction 55, and a direction from the side walls 37, 84 to the side walls 38, 85 of the housing 130 is coincident with the leftward direction 56. Further, when the ink cartridge 30 is attached to the cartridge-attachment section 110, an outer surface of the front wall of the housing 130 faces frontward; an outer surface of the rear wall of the housing 130 faces rearward; an outer surface of the bottom wall of the housing 130 faces downward; and an outer surface of the top wall 39 of the housing 130 faces upward.

As illustrated in FIG. 4, the ink cartridge 30, as a whole, has a flat shape whose dimensions in the up-down direction and the front-rear direction are respectively greater than a dimension thereof in the left-right direction.

[Lower Base 130B]

As described above, the housing 130 includes the lower base 130B and the outer cover 134.

As illustrated in FIG. 3, the lower base 130B has a box-like shape that is open upward. In other words, the lower base 130B has an upper end portion formed with an opening. In the present embodiment, the lower base 130B is a container made of resin. Inside the lower base 130B, a first storage chamber 32 and a second storage chamber 33 are formed.

The lower base 130B includes, as outer walls, the front wall 40, the rear wall 41, the side wall 37, the side wall 38, the main bottom wall 42, and the sub bottom wall 48. A distance between the front wall 40 and the rear wall 41 is greater than a distance between the side wall 37 and the side wall 38. The front wall 40, the rear wall 41, the side wall 37, the side wall 38, the main bottom wall 42 and the sub bottom wall 48 define the first storage chamber 32.

In the upright posture of the ink cartridge 30, a surface of the lower base 130B facing frontward is the front wall 40, and a surface of the lower base 130B facing rearward is the rear wall 41. The side walls 37 and 38 respectively extend to cross the front wall 40 and the rear wall 41. The side walls 37 and 38 respectively connect the front wall 40, the rear wall 41, the main bottom wall 42 and the sub bottom wall 48. In the upright posture, the side wall 37 faces rightward, and the side wall 38 faces leftward.

As illustrated in FIG. 4, the main bottom wall 42 is sloped relative to the front-rear direction such that a rear end thereof is positioned higher than a front end thereof. The front end of the main bottom wall 42 is positioned frontward of the rear surface 43BF described later. The rear end of the main bottom wall 42 is connected to the lower end of the rear wall 41. That is, the main bottom wall 42 extends frontward from the lower end of the rear wall 41. The sub bottom wall 48 is positioned higher than and frontward of the main bottom wall 42.

As illustrated in FIG. 3, an inner cover 131 is also provided to close the opening in the upper end portion of the lower base 130B. In the present embodiment, two kinds of inner covers 131 and 132 close the opening in the upper end portion of the lower base 130B. A space between the inner covers 131 and 132 serves as an airflow path 72 for allowing the first storage chamber 32 to be open to an atmosphere. Of the two inner covers 131 and 132, the inner cover 131 is positioned below the inner cover 132 and defines a ceiling of the first storage chamber 32. The inner cover 131 is formed with a through-hole 146. Through the through-hole 146, the first storage chamber 32 and the space between the two inner covers 131 and 132 (i.e., the airflow path 72) is allowed to communicate with each other. Incidentally, the through-hole 146 can be opened and closed by a valve mechanism 147 provided at the inner cover 132.

As illustrated in FIG. 3, the outer cover 134 has a box-like shape that is open downward. The outer cover 134 is coupled to the upper end portion of the lower base 130B such that the outer cover 134 covers the inner covers 131 and 132.

[Internal Structure of the Lower Base 130B]

As illustrated in FIG. 3, the first storage chamber 32, the second storage chamber 33, an ink valve chamber 35, and the airflow path 72 are formed inside the housing 130 (lower base 130B) of the ink cartridge 30.

The lower base 130B of the housing 130 further includes a lower wall 45. The lower wall 45 is a wall extending in the front-rear direction and the left-right direction. The lower wall 45 and the inner cover 131 oppose each other in the up-down direction. The first storage chamber 32 and the second storage chamber 33 are partitioned by the lower wall 45.

In the upright posture, the second storage chamber 33 is positioned below the first storage chamber 32 in an internal space of the housing 130 and functions to storing ink therein. A capacity of the second storage chamber 33 for accommodating ink therein is smaller than a capacity of the first storage chamber 32 for accommodating ink therein.

The second storage chamber 33 is in communication with the first storage chamber 32 through a communication port 47 formed in the lower wall 45. The communication port 47 is formed in a rear and right end portion of the lower wall 45. Further, the second storage chamber 33 is communication with the ink valve chamber 35 through a through-hole 99 formed in a partitioning wall 50 (see FIG. 3).

[Airflow Path 72]

As illustrated in FIG. 3, the airflow path 72 is a space that allows the first storage chamber 32 to communicate with the atmosphere. The space between the two inner covers 131 and 132 is in communication with the atmosphere through a through-hole (not shown) formed in the higher inner cover 132, and another through-hole formed in the outer cover 134. The airflow path 72 can be opened and closed by the valve mechanism 147. The valve mechanism 147 is configured to abut against a rib 118 of the cartridge case 101 (see FIG. 3) that protrudes downward from the top surface 57 of the cartridge case 101 during the attachment of the ink cartridge 30 to the cartridge case 101. As a result of the abutment against the rib 118, the valve mechanism 147 is pressed downward to open the airflow path 72.

[Ink Supply Portion 34]

As illustrated in FIGS. 3 and 4, the ink supply portion 34 extends frontward from the housing 130, more specifically, from the step wall 49 of the lower base 130B. As illustrated in FIG. 3, the ink supply portion 34 includes a hollow cylinder 75, a sealing 76, a valve 77, the coil spring 78, and a cap 79.

The cylinder 75 protrudes in the frontward direction 51 from the step wall 49. The cylinder 75 has a cylindrical-shaped contour. The cylinder 75 has a front end formed with an opening. The cylinder 75 defines an inner space therein that serves as the ink valve chamber 35. The ink valve chamber 35 extends in the front-rear direction. The cylinder 75 has a tip end portion that faces frontward. The tip end portion of the cylinder 75 is positioned below and rearward of the front wall 40.

The sealing 76 is a generally disk-shaped member. The sealing 76 is made of an elastic material such as rubber or elastomer. The sealing 76 is provided at the front end of the cylinder 75 so as to cover the opening in the front end. The sealing 76 has a center portion formed with a through hole that penetrates the same in the front-rear direction. A tubular-shaped inner peripheral surface defining the through hole provides a through-hole 73 in the sealing 76. The through-hole 73 has a diameter that is slightly smaller than an outer diameter of the ink supply tube 102.

The valve 77 and the coil spring 78 are accommodated in the ink valve chamber 35. The valve 77 is movable in the frontward direction 51 and the rearward direction 52 so as to be capable of contacting and separating from the sealing 76. By the valve 77 contacting and separating from the sealing 76, the through-hole 73 formed in the center portion of the sealing 76 is opened and closed. The coil spring 78 urges the valve 77 forward. Accordingly, without application of an external force, the valve 77 closes the through-hole 73 of the sealing 76.

As illustrated in FIG. 4, the cap 79 has an outer shape of a generally rectangular parallelepiped. The cap 79 is hollow. Incidentally, the cap 79 may have a shape other than the rectangular parallelepiped, provided that the cap 79 is a hollow member whose front and rear ends are opened. As illustrated in FIG. 3, the cap 79 has a front surface formed with an ink supply port 71. In a state where the cap 79 covers the cylinder 75 and the sealing 76, the ink valve chamber 35 is in communication with an outside of the ink cartridge 30 through the through-hole 73 of the sealing 76 and the ink supply port 71 of the cap 79.

As illustrated in FIG. 3, in the state where the cap 79 covers the cylinder 75 and the sealing 76, the sealing 76 is fixed while being nipped between the cap 79 and the cylinder 75. Further, a gap between the sealing 76 and the cylinder 75, and a gap between the sealing 76 and the cap 79 are liquid-tightly sealed.

[Outer Cover 134]

As illustrated in FIGS. 3 through 5, the outer cover 134 is positioned on top of the lower base 130B. In other words, the outer cover 134 is positioned higher than the ink supply portion 34. The outer cover 134 has a box-like shape that is open downward. The outer cover 134 includes the top wall 39, the front wall 82, the rear wall 83, the side wall 84, and the side wall 85. The front wall 82 is connected to the front end of the top wall 39, and extend downward therefrom. The rear wall 83 is connected to the rear end of the top wall 39 and extends downward therefrom. The side wall 84 extends downward from a right end of the top wall 39 to connect the front wall 82 and the rear wall 83. The side wall 85 extends downward from a left end of the top wall 39 to connect the front wall 82 and the rear wall 83.

As illustrated in FIG. 4, the side wall 85 is formed with three engaging holes 86.

Although not shown in the drawings, the side wall 84 is also formed with three engaging holes 86. In each of the side walls 84 and 85, the three engaging holes 86 are arranged to be spaced away from one another in the front-rear direction.

The three engaging holes 86 formed in the side wall 84 and the three engaging holes 86 formed in the side wall 85 are respectively at the same front-rear positions overlapping with each other when viewed in the left-right direction.

With each of the engaging holes 86, an engaging pawl 88 of the lower base 130B is engaged. The outer cover 134 is thus coupled to the lower base 130B from above to cover the same. Incidentally, in the present embodiment, the engaging holes 86 are formed in the outer cover 134 and the engaging pawls 88 are formed at the lower base 130B. Alternatively, the engaging pawls 88 may be formed at the outer cover 134 and the engaging holes 86 may be formed in the lower base 130B. In a state where the outer cover 134 is assembled to the lower base 130B, the front walls 82 and 40 constitute an outer surface of the ink cartridge 30 facing frontward. Further, the rear walls 83 and 41 constitute an outer surface of the ink cartridge 30 facing rearward. Still further, the side walls 84 and 37, and the side walls 85 and 38 respectively constitute the outer surfaces of the ink cartridge 30 facing laterally.

The top wall 39 includes a first main top wall 61, a second main top wall 62, and a sub top wall 63. The first main top wall 61 is positioned rearward in the front-rear direction. The second main top wall 62 extends from the first main top wall 61 and is positioned frontward of the first main top wall 61. The sub top wall 63 extends from the second main top wall 62 and is positioned frontward of the second main top wall 62. The first main top wall 61 has an upper surface which is a flat plane extending in the left-right direction and the front-rear direction. The second main top wall 62 has an upper surface which is a flat plane extending in the left-right direction and the front-rear direction and positioned lower than the upper surface of the first main top wall 61. The sub top wall 63 has an upper surface which is a sloped flat plane extending in the left-right direction and sloping downward toward the front. Accordingly, the upper surface of the sub top wall 63 is positioned lower than the upper surface of the second main top wall 62.

As illustrated in FIGS. 4 and 5, the first main top wall 61 is formed with a slot 44 extending in the front-rear direction. The slot 44 is positioned above the through-hole 146 of the inner cover 131.

On the first main top wall 61, a protrusion 43 is formed to protrude upward. The protrusion 43 is immovable in the up-down direction and in the front-rear direction relative to the top wall 39. The protrusion 43 includes a right protruding portion 43R, a left protruding portion 43L, and the rear protruding portion 43B. The right protruding portion 43R and the left protruding portion 43L are positioned to be spaced away from each other in the left-right direction. The right protruding portion 43R and the left protruding portion 43L respectively extend in the front-rear direction. The rear protruding portion 43B extends in the left-right direction to connect rear ends of the right protruding portion 43R and the left protruding portion 43L. The right protruding portion 43R, the left protruding portion 43L and the rear protruding portion 43B define right, left and rear edges of the slot 44, respectively. The rear protruding portion 43B has the rear surface 43BF with which the lock shaft 145 is accessible.

The rear surface 43BF is a surface of the protrusion 43 facing rearward. The rear surface 43BF is positioned higher than the top wall 39. The rear surface 43BF extends in the up-down direction. The rear surface 43BF is a surface that can face rearward and contact the lock shaft 145 in a state where the ink cartridge 30 is attached to the cartridge-attachment section 110. By the rear surface 43BF facing rearward and contacting with the lock shaft 145, the ink cartridge 30 can be held in the cartridge-attachment section 110 against an urging force of the coil spring 78.

In the protrusion 43, the right protruding portion 43R and the left protruding portion 43L are formed frontward of the rear surface 43BF with the slot 44 interposed between the right protruding portion 43R and the left protruding portion 43L. Each of the right protruding portion 43R and the left protruding portion 43L has an upper surface configured of a horizontal surface 154 and a sloped surface 155. The horizontal surface 154 is connected to the rear surface 43BF. The sloped surface 155 is positioned frontward of the horizontal surface 154. The sloped surface 155 is connected to the horizontal surface 154. The sloped surface 155 faces upward and frontward. The sloped surface 155 is sloped relative to the front-rear direction such that a front end thereof is positioned lower than a rear end thereof. The rear surface 43BF and the sloped surface 155 are connected to each other via the horizontal surface 154. Thus, a boundary edge between the rear surface 43BF and the sloped surface 155 does not form a ridge-like shape. The lock shaft 145 can be guided smoothly to the rear surface 43BF by the sloped surface 155 and horizontal surface 154, while being in contact therewith, during the insertion of the ink cartridge 30 into the cartridge-attachment section 110.

On the first main top wall 61, an operation portion 90 is also provided at a position rearward of the rear surface 43BF. The operation portion 90 is adapted to be accessed and operated by a user. The operation portion 90 is formed integrally with the outer cover 134.

Incidentally, each of the outer surfaces of the front walls 40 and 82, the rear walls 41 and 83, the top wall 39, the main bottom wall 42, the sub bottom wall 48, the side walls 37 and 84, and the side walls 38 and 85 need not be a single flat plane. That is, outer surfaces of the front walls 40 and 82 are surfaces that can be observed when the ink cartridge 30 in the upright posture is viewed from frontward thereof toward the rear, and that are positioned forward than a front-rear center of the ink cartridge 30 in the upright posture. Outer surfaces of the rear walls 41 and 83 are surfaces that can be observed when the ink cartridge 30 in the upright posture is viewed from rearward thereof toward the front, and that are positioned rearward than the front-rear center of the ink cartridge 30 in the upright posture. An outer surface of the top wall 39 (that is, outer surfaces of the first main top wall 61, the second main top wall 62, and the sub top wall 63) is a surface that can be observed when the ink cartridge 30 in the upright posture is viewed from above, and that is positioned upward of a center of the ink cartridge 30 in the upright posture with respect to the up-down direction. Outer surfaces of the main bottom wall 42 and the sub bottom wall 48 are surfaces that can be observed when the ink cartridge 30 in the upright posture is viewed from below, and that are positioned lower than the center of the ink cartridge 30 in the upright posture with respect to the up-down direction. The same can be applied to outer surfaces of the side walls 37, 38, 84 and 85, respectively.

Incidentally, the housing 130 of the ink cartridge 30 does not necessarily include the lower base 130B and the outer cover 134. Further, a chamber for storing ink need not be divided into the first storage chamber 32 and the second storage chamber 33. That is, the ink cartridge 30 may include a housing having a storage chamber therein that is defined by the top wall 39, the front wall 40, the rear wall 41, the side wall 37, the side wall 38, the main bottom wall 42 and the sub bottom wall 48.

As illustrated in FIGS. 4 and 5, the rib 67 is formed on the upper surfaces of the second main top wall 62 and the sub top wall 63 to protrude upward. The rib 67 is immovable in the up-down direction and in the front-rear direction relative to the top wall 39. The rib 67 extends in the front-rear direction to span across the upper surfaces of the second main top wall 62 and sub top wall 63. More specifically, the rib 67 extends in the front-rear direction to have a front end 67F and a rear end 67R opposite thereto. A dimension in the front-rear direction between the front end and the rear end of the rib 67 is greater than a distance between a front end 63F (frontmost point) of the sub top wall 63 of the housing 130 and the front end of the rib 67. That is, the rib 67 extends in the front-rear direction such that the front end 67F is positioned near the front end 63F of sub top wall 63 of the housing 130.

The rib 67 is positioned forward of the protrusion 43. The rib 67 is positioned forward of an IC board 64 described later. The rib 67 has a flat plate-like shape whose front-rear dimension is larger than left-right and up-down dimensions thereof. The rib 67 has a front surface (front end 67F), a main upper surface 68, and a sub upper surface 69. The main upper surface 68 is a flat plane extending in the front-rear direction and the left-right direction. The sub upper surface 69 is connected to the main upper surface 68 and positioned frontward of the main upper surface 68. The sub upper surface 69 is a sloped flat plane that is inclined relative to the front-rear direction to slope downward toward the front. The main upper surface 68 has a front-rear dimension that is larger than a front-rear dimension of the sub upper surface 69. The sub upper surface 69 is positioned higher than the sub top wall 63.

As illustrated in FIGS. 4 and 8, the left-right position of the rib 67 on the second main top wall 62 varies according to a type of the ink cartridge 30, such as a type and an initial amount of the ink sored in the ink cartridge 30. The rib 67 can pass through the slit 117 of the gate 113 when inserted into the right place in the cartridge-attachment section 110. However, the rib 67 cannot pass through a slit 117 of another gate 113 when inserted into a place (the another gate 113) to which the ink cartridge 30 should not be attached. Further, the user can visually confirm the left-right position of the rib 67 to identify the type of the ink cartridge 30.

[IC Board 64]

As illustrated in FIGS. 4 and 5, the IC board 64 is disposed at the upper surface of the first main top wall 61 at a position between the rib 67 and the protrusion 43 in the front-rear direction. In other words, the IC board 64 is supported directly at the top wall 39 of the outer cover 134. A support portion 66 is formed on the upper surface of the first main top wall 61 to protrude upward therefrom, and the IC board 64 is fixed to the outer cover 134 by being coupled to the support portion 66. The IC board 64 is electrically connected to three contacts 106 (see FIG. 3) during the insertion of the ink cartridge 30 into the cartridge-attachment section 110, and is also electrically connected to the contacts 106 in the state where the ink cartridge 30 is attached to the cartridge-attachment section 110.

The IC board 64 includes a substrate, an IC (not shown in the drawings), and three electrodes 65. The substrate supports the IC. The three electrodes 65 are formed on the substrate. The three electrodes 65 and the IC are electrically connected to each other. The three electrodes 65 respectively extend in the front-rear direction, and arrayed in the left-right direction. The three electrodes 65 are arranged on an upper surface of the substrate such that the electrodes 65 are exposed to allow electrically access thereto. With this configuration, the three contacts 106 of the cartridge case 101 can directly make contact with upper surfaces of the three electrodes 65, respectively. The IC is an integrated circuit, and readably stores data indicating information relating to the ink cartridge 30, such as a lot number, a manufacturing date, and a color of the ink. Incidentally, the substrate may be a so-called rigid substrate or may be a flexible substrate having flexibility. Further, the number of electrodes 65 is not limited, and may be four, for example.

[Position of Each Element in the Ink Cartridge 30]

Hereinafter, with reference to the posture of the ink cartridge 30 illustrated in FIG. 5, positions of the respective elements in a state where the ink cartridge 30 is viewed in the left-right direction will be described.

The horizontal surface 154, which is the upper surface of the protrusion 43, is positioned higher than an upper edge 67FU of the front end 67F of the rib 67. The front end 67F of the rib 67 is defined as a front surface extending upward from the sub top wall 63 and facing frontward. The upper edge 67FU is a boundary between the sub upper surface 69 and the front surface (front end 67F) extending upward from the sub top wall 63 and facing frontward. The horizontal surface 154 of the protrusion 43 is positioned rearward of a center point C1 of the housing 130 in the front-rear direction. The protrusion 43 is positioned on the upper surface of the first main top wall 61. The upper edge 67FU of the front end 67F of the rib 67 is positioned frontward of the center point C1. The front end 67F of the rib 67 is positioned frontward of the ink supply port 71 of the ink supply portion 34. The front end 67F of the rib 67 is positioned at the sub top wall 63. More specifically, the front end 67F of the rib 67 is positioned to be spaced apart from the front wall 82 of the front-rear direction and from each of the side walls 84 and 85 in the left-right direction. That is, the front end 67F of the rib 67 is positioned away from a periphery of the top wall 39 with respect to the front-rear direction and left-right direction.

The front end 67F of the rib 67 is positioned forward than any one of the engaging holes 86. The rear end 67R of the rib 67 (i.e., the end opposite the front end 67F in the front-rear direction) is positioned further rearward than one of the engaging holes 86 which is positioned frontmost thereamong in the front-rear direction. The rib 67 extends to span more than a half of a front-rear dimension D1 which is a sum of front-rear dimensions of the upper surfaces of the second main top wall 62 and sub top wall 63. With this structure, since the upper wall 39 of the outer cover 134 is reinforced by the rib 67, the upper wall 39 is hard to deform even when an external force is applied thereto. Accordingly, peripheral walls (side walls 84 and 85) of the outer cover 134 is restrained from deforming in such a way that a gap distance in the left-right direction between the side walls 84 and 85 is enlarged, and, hence, engagement between the engaging pawls 88 and the engaging holes 86 is less likely to be released.

In FIG. 5, an imaginary plane 150 is indicated by a phantom line. The imaginary plane 150 passes through each of a first point and a second point. Here, the first point is a point on the upper surface of the protrusion 43. More specifically, in the present embodiment, the first point on the upper surface of the protrusion 43 is a boundary 156 between the horizontal surface 154 and the sloped surface 155. In other words, the first point is a highest point on the upper surface of protrusion 43 in the present embodiment. The second point in the present embodiment is defined as the upper edge 67FU of the front end 67F of the rib 67. The imaginary plane 150 also extends in the left-right direction.

Note that the protrusion 43 and the rib 67 are located below the imaginary plane 150, meaning that the imaginary plane 150 is assumed not to cross the protrusion 43 and the rib 67. Hence, in a side view of the ink cartridge 30 depicted in FIG. 5, the imaginary plane 150 is in contact with the protrusion 43 at the boundary 156, and in contact with the rib 67 at the upper edge 67FU.

An entirety of the outer surface (outline) of the ink cartridge 30 is positioned below the imaginary plane 150 in a region between the first point (the boundary 156 of the protrusion 43) and the second point (the upper edge 67FU of the front end 67F of the rib 67) in the front-rear direction. In other words, no part of the ink cartridge 30 is positioned higher than the imaginary plane 150 in the region between the first point (the boundary 156) and the second point (the upper edge 67FU) in the front-rear direction. Accordingly, a boundary 70 between the upper surface of the second main top wall 62 and the upper surface of the sub top wall 63 is positioned below the imaginary plane 150. Further, the IC board 64 is positioned below the imaginary plane 150. Further, the front end of the top wall 39, that is, the front end 63F of the sub top wall 63, is positioned below the imaginary plane 150.

Here, the term "part" of the ink cartridge 30 may be: any part integrally formed with the housing 130; any part detachably connected to the housing 130; or any part belonging to a body that is to be attached to the housing 130 when the ink cartridge 30 is mounted in and used in the printer 10.

Further, a front edge 65F of each electrode 65 in the IC board 64 is positioned rearward of a center point C2 in the front-rear direction of the region between the first point (the boundary 156 of the protrusion 43) and the second point (the upper edge 67FU of the front end 67F of the rib 67) each of which the imaginary plane 150 passes through. That is, a distance between the center point C2 and the first point in the front-rear direction is equal to a distance between the center point C2 and the second point in the front-rear direction.

A distance L1 in the front-rear direction from the front edges 65F of the electrodes 65 in the IC board 64 to the boundary 156 (the first point, i.e., a point of contact between the protrusion 43 and the imaginary plane 150), is shorter than a distance L2 in the front-rear direction from the front edges 65F of the electrodes 65 on the IC board 64 to the upper edge 67FU of the front end 67F of the rib 67 (the second point, i.e., a point of contact between the rib 67 and the imaginary plane 150). That is, an equality L1<L2 is satisfied.

Further, as illustrated in FIG. 5, in a side view of the ink cartridge 30 in the left-right direction, the imaginary plane 150 can also be defined as an imaginary line that includes at least the following two points: the first point (the boundary 156 of the protrusion 43); and the second point (the upper edge 67FU of the front end 67F of the rib 67). At this time, in an entire region in the front-rear direction from the front wall 40 (the frontmost edge of the housing 130) to the rear wall 41 (the rearmost edge of the housing 130), a contour of the ink cartridge 30 is positioned below the imaginary plane 150 (the phantom line in FIG. 5).

The distance L1 in the front-rear direction from the front edges 65F of the electrodes 65 in the IC board 64 to the boundary 156 of the protrusion 43 included in the imaginary line (imaginary plane 150) is shorter than the distance L2 in the front-rear direction from the front edges 65F of the electrodes 65 in the IC board 64 to the upper edge 67FU of the rib 67 included in the imaginary line (imaginary plane 150).

Further, the horizontal surface 154, which is the upper surface of the protrusion 43, is positioned closer to the rearmost edge of the housing 130 than to the frontmost edge of the housing 130 in the front-rear direction. The sub upper surface 69 of the rib 67 is positioned closer to the frontmost edge of the housing 130 than to the rearmost edge of the housing 130 in the front-rear direction.

[Technical Advantages of the Embodiment]

Figure 6:
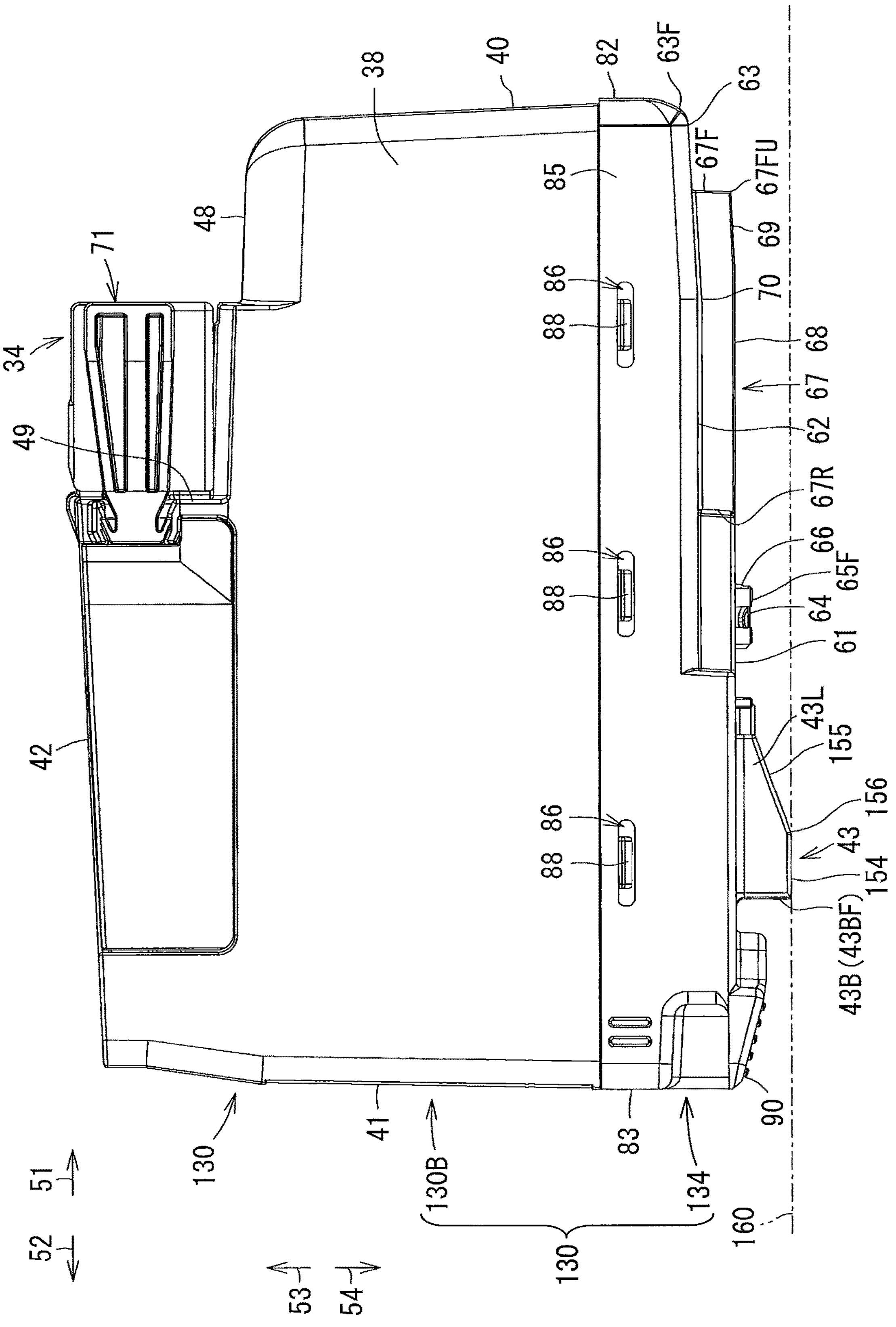
FIG. 6 is a side view illustrating a state where the ink cartridge 30 according to the embodiment turned upside down collides against a floor 160 with a horizontal surface 154 of a protrusion 43.

According to the ink cartridge 30 of the described embodiment, no part of the ink cartridge 30 is positioned higher than the imaginary plane 150 in the region in the front-rear direction between the first point (the boundary 156 of the protrusion 43) and the second point (the upper edge 67FU of the front end 67F of the rib 67). That is, an outer surface of any part of the ink cartridge 30 (outline of the liquid cartridge 30) is located below the imaginary plane 150 in the region between the first point (the boundary 156 of the protrusion 43) and the second point (the upper edge 67FU of the front end 67F of the rib 67) in the front-rear direction. Hence, when the ink cartridge 30 drops upside down onto a floor 160, the horizontal surface 154 of the protrusion 43, among others, first collides against the floor 160, as depicted in FIG. 6. That is, one of the protrusion 43 and the rib 67, which is higher than the remaining one of the protrusion 43 and the rib 67, first collides against the floor 160. Since the protrusion 43 is higher than the rib 67 in the present embodiment, the horizontal surface 154 (the highest point) of the protrusion 43 collides against the floor 160 prior to the rib 67.

Figure 7:
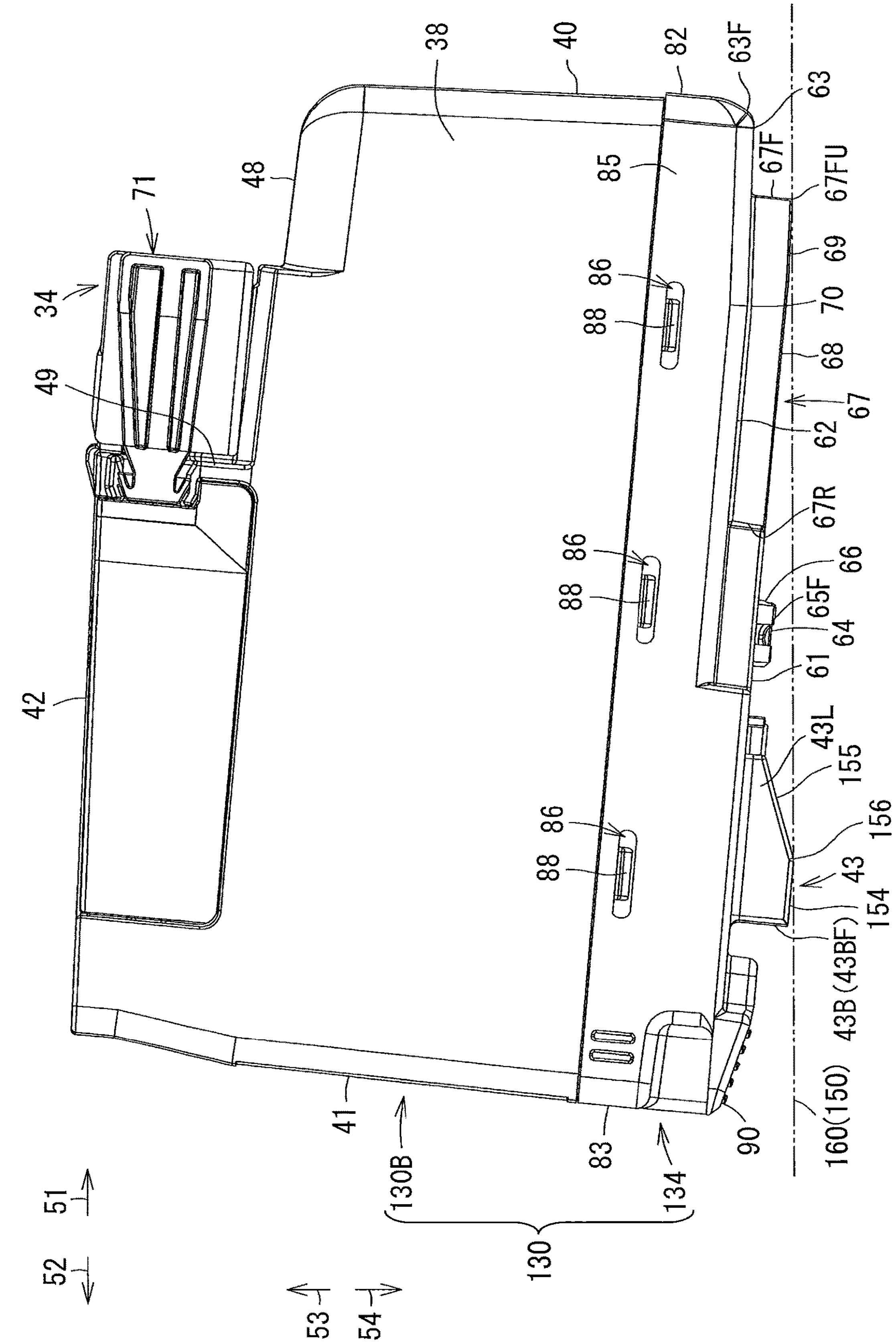
FIG. 7 is a side view illustrating a state where the ink cartridge 30 according to the embodiment turned upside down collides against the floor 160 with a boundary 156 of the protrusion 43 and an upper edge 67FU of a front end 67F of a rib 67.

Thereafter, the ink cartridge 30 pivots clockwise in FIG. 6, due to the gravitational force or acceleration thereof, and the upper edge 67FU of the front end 67F of the rib 67 then collides against the floor 160, as illustrated in FIG. 7. With this structure, compared to a configuration where the ink cartridge 30 were without the rib 67, there is a smaller change in posture of the housing 130 (angular rotation) upon collision of the dropped ink cartridge 30 against the floor 160. Thus, splash of ink through the ink supply port 71 of the ink supply portion 34 is less likely to occur. Incidentally, a state depicted in FIG. 7 is a state where the protrusion 43 and the rib 67 of the ink cartridge 30 are in contact with a single flat plane (i.e., the floor 160, or the imaginary plane 150). In this state, a gap is formed between the imaginary plane 150 and the IC board 64 vertically.

Further, since the front edges 65F of the electrodes 65 of the IC board 64 is positioned further rearward of the center point C2 in the front-rear direction, clearance (a gap) can be reliably ensured between the imaginary plane 150 and the IC board 64 in the up-down direction. Accordingly, in a case where the ink cartridge 30 is dropped and collides against the floor 160, there is less likely that the function in the IC board 64 gets damaged by, for example, contact of the IC board 64 against the floor 160.

Still further, the dimension in the front-rear direction of the rib 67 between the front end 67F and the rear end 67R is greater than the distance in the front-rear direction between the front end 63F of the sub top wall 63, which is a frontmost end of the housing 130, and the front end 67F of the rib 67. That is, the rib 67 extends in the front-rear direction such that the front end 67F thereof is provided at a position in the vicinity of the front end 63F of the housing 130. With this structure, clearance (a gap) in the up-down direction can be further reliably ensured between the imaginary plane 150 and the IC board 64 compared to a case where the front end 67F of the rib 67 is not provided near the front end 63F of the housing 130. Further, since the rib 67 has a long dimension in the front-rear direction, impact may hardly occur on the top wall 39 of the housing 130 in a case where the ink cartridge 30 is dropped and collides against the flat plane such as the floor 160.

Still further, in the present embodiment, the protrusion 43 and the rib 67 protrude upward from the top wall 39 and are immovable in the up-down direction and relative to the top wall 39. The IC board 64 is positioned between the protrusion 43 and the rib 67 in the front-rear direction and is lower than the imaginary plane 150 passing through each of the first point (the boundary 156 on the upper surface of the protrusion 43) and the second point (the upper edge 67FU of the front end 67F of the rib 67) and extending in the left-right direction. With this structure, when the ink cartridge 30 is dropped onto a flat plane such as the floor 160, a gap (clearance) can be reliably formed between the flat plane (the floor 160) and the IC board 64. Accordingly, the IC board 64 can be reliably protected from the impact at the time of fall of the ink cartridge 30 onto the floor 160.

Further, in the ink cartridge 30 of the present embodiment, the front end 67F of the rib 67 is positioned forward of the ink supply port 71 of the ink supply portion 34 in the frontward direction 51. That is, the front-rear dimension of the rib 67 can be made longer, compared to a conventional cartridge whose ink supply portion is positioned forward the front end 67F of the rib 67.

In an attempt to increase a volume of a storage chamber, an ink supply portion tends to be arranged to a position further forward, i.e., in a direction away from the protrusion 43, as in the above-mentioned conventional cartridge. When this conventional cartridge is dropped onto the floor 160, the protrusion 43 first comes into contact with the floor 160 and subsequently the rib 67 comes into contact with the floor 160 as described earlier. While the protrusion 43 and the rib 67 sequentially collide against the floor 160, the ink cartridge may pivot about the protrusion 43. During the pivoting of this ink cartridge, rotational movement is applied to the ink supply portion 34 positioned frontward than the front end 67F of the rib 67. As a result, leakage of ink through the ink supply port 71 of the ink supply portion 34 is likely to occur.

In contrast, in the ink cartridge 30 according to the present embodiment, the front end 67F of the rib 67 is positioned forward of the ink supply portion 34 provided at the housing 130 (lower base 130B) defining the first and second storage chambers 32, 33 therein. With this structure of the embodiment, compared to the above conventional cartridge, the pivoting amount (amount of angular rotation) of the ink cartridge 30 can be made smaller when the ink cartridge 30 is dropped onto the floor 160. Thus, rotational moment imparted on the ink supply portion 34 at the time of collision against the floor 160 can also be made smaller, thereby reducing a risk of ink leakage through the ink supply port 71. The ink cartridge 30 according to the present embodiment can thus suppress occurrence of ink leakage through ink supply portion 34 at the time of dropping onto the floor 160, without decrease in volume of the storage chamber in the housing 130.

Further, the longer front-rear dimension of the rib 67 of the present embodiment can also serve to mitigate the impact to be transmitted to the top wall 39 upon collision of the rib 67 against a flat plane such as the floor 160, and can provide an enhanced strength to the top wall 39 of the housing 130.

Further, since the dimension of the rib 67 in the front-rear direction is greater than the dimensions thereof in the up-down direction and the left-right direction, the rib 67 is hard to get damaged even when the rib 67 is made into contact with a flat plane such as the floor 160 as a result of a fall of the ink cartridge 30 onto the floor 160. Further, since the first protrusion 43 is constituted by the right protruding portion 43R and the left protruding portion 43L connected to each other by the rear protruding portion 43B, the first protrusion 43 has a higher impact-resistance than that of the rib 67.

Further, since the rear protruding portion 43B has the engaging surface 43BF facing rearward in the front-rear direction for engagement with the lock shaft 145 of the cartridge case 101 in a state where the ink cartridge 30 is attached to the cartridge case 101, the rearward-facing surface (the engaging surface 43BF) of the first protrusion 43 can be used for positioning of the ink cartridge 30 in the cartridge case 101, without provision of a separate engaging member on the ink cartridge 30.

Further, the sub top wall 63 extends from the second main top wall 62, and is positioned forward of the second main top wall 62 in the front-rear direction. Hence, even when the ink cartridge 30 is dropped onto a flat surface such as the floor 160, the sloped sub top wall 63 is less likely to collide against the floor 160. Further, since the rib 67 is positioned to extend across the boundary 70 between the second main top wall 62 and the sub top wall 63, the boundary 70 can be reinforced by the rib 67.

Further, the boundary 70 is positioned below the imaginary plane 150 in the above-described embodiment. Accordingly, even when the ink cartridge 30 is dropped onto a flat surface such as the floor 160, the collision of the boundary 70 of the top wall 39 against the floor 160 can be avoided. Consequently, deformation of the top wall 39 near the boundary 70 can be suppressed.

Further, since the rib 67 extends along the sub top wall 63 and the second main top wall 62 of top wall 39, the rib 67 has a dimension sufficiently long enough to reinforce the top wall 39 of the housing 130.

Further, the upper surface of the rib 67 has the sub upper surface 69 and the main upper surface 68. The sloped sub upper surface 69 is positioned forward of the main upper surface 68 in the front-rear direction. With this structure, the sub upper surface 69 is less likely to come into contact with the cartridge case 101 during the insertion of the ink cartridge 30 into the cartridge case 101.

Further, since the front end 67F of the rib 67, which tends to be applied with an external force, is positioned frontward than any one of the engaging pawls 86 in the front-rear direction, the external force applied to the rib 67 is less likely to be transmitted to the engaging pawls 86.

Further, the rear end 67R of the rib 67 is positioned further rearward than one of the engaging holes 86 that is positioned frontmost thereamong in the front-rear direction. That is, the rib 67 extends in the front-rear direction to have a length long enough to cover an entire dimension of the frontmost engaging hole 86 in the front-rear direction, thereby further reinforcing the cover 134.

Further, since the rib 67 is in a form of a wall elongated in the front-rear direction, the rib 67 is hard to interfere with a component of the cartridge case 101 during the attachment of the ink cartridge 30 into the cartridge case 101. Further, since the front-rear dimension of the rib 67 is greater than the vertical dimension thereof, the rib 67 is hard to get damaged even when the rib 67 is made into contact with the floor 160 as a result of a fall of the ink cartridge 30 onto the floor 160. Further, the protrusion 43 is constituted by the right protruding portion 43R and the left protruding portion 43L connected to each other by the rear protruding portion 43B. Accordingly, the protrusion 43 has a higher impact-resistance than that of the rib 67.

Further, the sub top wall 63 is provided at the frontmost portion of the top wall 39, and the rib 67 has the sub upper surface 69. Hence, during the attachment of the ink cartridge 30 to the cartridge case 101, abutment of the sub top wall 63 and the sub upper surface 69 against the top surface 57 of the cartridge case 101 and the like less likely occurs.

Further, the outer cover 134 includes the front wall 82, the side walls 84 and 85 as a peripheral wall extending downward from the periphery of the top wall 39. The front end 67F of the rib 67 is positioned to be spaced apart from the front wall 82 in the front-rear direction and from each of the side walls 84 and 85 in the left-right direction. With this structure, since the front end 67F of the rib 67 is spaced away from each of the front wall 82 and the side walls 84 and 85, an external impact applied onto the front wall 82 and the side walls 84, 85 is less likely to be transmitted to the rib 67. Hence, deformation of the rib 67 resulting from the impact can be suppressed.

[Modifications]

While the imaginary plane 150 is defined by the rib 67 and the protrusion 43 provided on the top wall 39 in the above-described embodiment, instead of the rib 67 or in addition to the rib 67, a protrusion may be provided at a position frontward of the IC board 64 on the top wall 39 to protrude further upward than the rib 67. In the modification illustrated in FIG. 10, an ink cartridge 30 includes a protrusion 391 protruding further upward than the rib 67. The protrusion 391 is provided on the top wall 39 of a housing 330 at a position frontward of the IC board 64. The protrusion 391 has a circular columnar shape. However, the protrusion 391 may have a prismatic columnar shape, a cone shape, a pyramid shape, or a dome-like shape. In this case, an imaginary plane in contact with each of the horizontal surface 154, which is the upper surface of the protrusion 43 and an upper surface 391U of the protrusion 391 and extending in the left-right direction serves as an imaginary plane 350.

Figure 10:
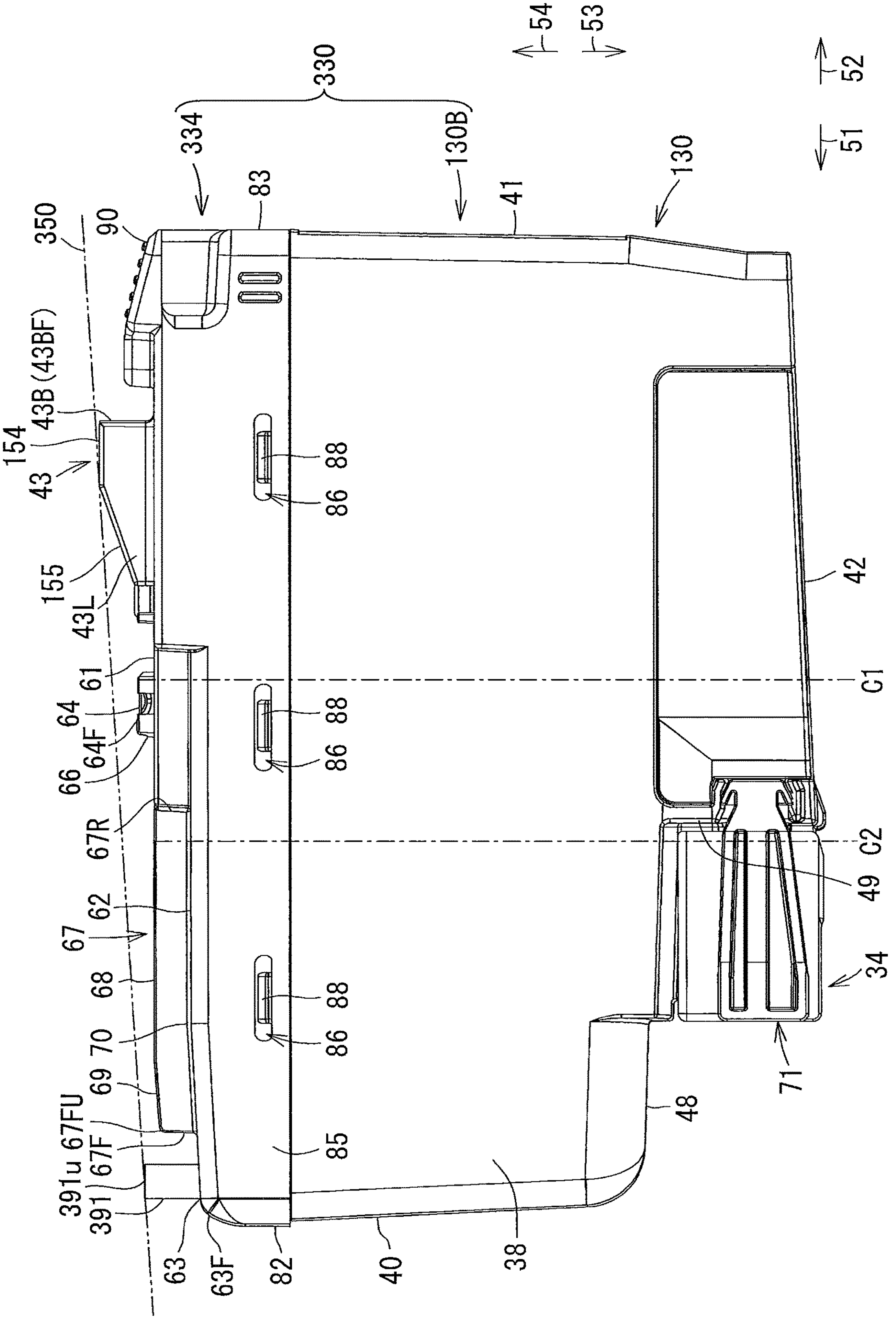
FIG. 10 is a side view of a liquid cartridge 30 according to another variation of the embodiment in which a protrusion 391 is provided.

Also in this modification illustrated in FIG. 10, in a side view of the ink cartridge 30 in the left-right direction, the imaginary plane 350 can be defined as an imaginary line that passes through at least the following two points: the boundary 156 between the horizontal surface 154 and the sloped surface 155 of the protrusion 43 (first point); and a point of the upper surface 391U of the protrusion 391 (second point). At this time, in a region between the first point and the second point in the front-rear direction, an outline of the ink cartridge 30 is positioned below the imaginary line (imaginary plane 350). Also, the outline of the ink cartridge is positioned below the imaginary line (imaginary plane 350) in a region between the front wall 40 and the rear wall 41 of the housing 130 in the front-rear direction.

In the depicted embodiment, the support portion 66 is provided on the first main top wall 61 of the outer cover 134, and the first main top wall 61 directly supports the IC board 64. However, instead of the support portion 66, a separate supporting member may be assembled to the first main top wall 61 for supporting the IC board 64. That is, the first main top wall 61 may support the IC board 64 indirectly, rather than directly. Incidentally, the supporting member detachably attached to the top wall 39 for supporting the IC board 64 may constitute the "part" of the ink cartridge 30 that is positioned below the imaginary plane 150 in the region between the first point and the second point in the front-rear direction. Thus, providing such detachable "part" for supporting the IC board 64 separately from the housing 130 can prevent the IC board 64 from directly colliding against a flat plane such as the floor 160, after the protrusion 43 abuts on the floor 160 when the ink cartridge 30 is dropped onto the floor 160.

Figure 9:
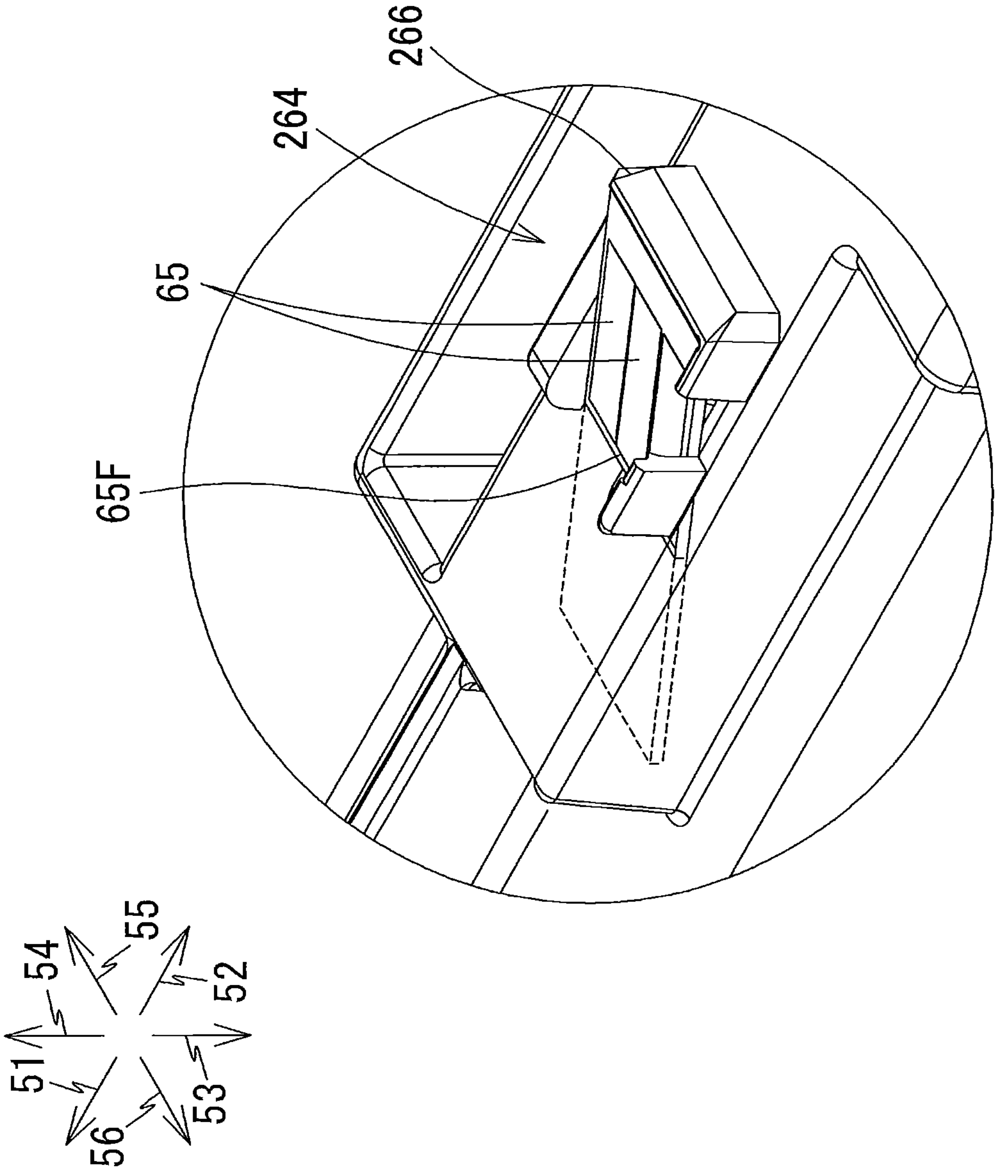
FIG. 9 is a partial perspective view illustrating a structure for supporting an IC board 64 in the liquid cartridge 30 according a variation of the embodiment.

Further, the IC board 64 as a whole, which the support portion 66 supports, may not necessarily be exposed to the outside. For example, as illustrated in FIG. 9, only a portion of the IC board 64 at which the electrodes 65 are positioned may be exposed to the outside of the support portion 66, while a remaining portion of the IC board 64 may be accommodated in an interior of the support portion 66. Here, the support portion 66 need not be fixed to the top wall 39, but may be a separate member detachably attachable to the top wall 39 for supporting the IC board 64.

Further, in the above-described ink cartridge 30, the rear surface 43BF of the protrusion 43 is in engagement with the lock shaft 145 in the state where the ink cartridge 30 is attached to the cartridge case 101. Alternatively, the ink cartridge 30 may be retained in the attached state relative to the cartridge case 101 by engagement or contact of a portion of the ink cartridge 30 other than the protrusion 43 with a component of the cartridge case 101.

Further, in the depicted embodiment, the valve mechanism 147 is positioned between the right protruding portion 43R and the left protruding portion 43L of the protrusion 43. However, the valve mechanism 147 and airflow path 72 may be provided at a position away from the protrusion 43. If this is the case, the right protruding portion 43R and the left protruding portion 43L of the protrusion 43 may only function to provide a space for receiving the rib 118 of the cartridge case 101 during the attachment of the ink cartridge 30 to the cartridge case 101.

Further, in the above-described embodiment, the front edge 65F of each electrode 65 in the IC board 64 is positioned further rearward than the front-rear center point C2 in the region in the front-rear direction between the first point (boundary 156 of the protrusion 43) and the second point (the upper edge 67FU of the front end 67F of the rib 67) with each of which the imaginary plane 150 is in contact. Further preferably, a front edge of the IC board 64 may also be positioned further rearward than the center point C2.

Incidentally, in the present embodiment, the protrusion 43 and rib 67 both protrude upward from the top wall 39. That is, the protrusion 43 and rib 67 are integrally formed with the top wall 39. However, the protrusion 43 and the rib 67 (the first protrusion and second protrusion of the disclosure) need not be integral with the top wall 39 of the outer cover 134, but may be configured as members detachably connected to the top wall 39. That is, the first protrusion and second protrusion of the disclosure may be provided separately from the top wall 39 and penetrate vertically through the top wall 39 (for example, through a through-hole in the top wall 39), so that the first and second protrusions protrude upward relative to the top wall 39.

In the depicted embodiment, the ink is used for description as an example of liquid. However, instead of the ink, a pretreatment liquid that is to be ejected onto sheets prior to ink during a printing operation may be stored in a liquid cartridge. Alternatively, cleaning water for cleaning the recoding head 21 may be stored in the liquid cartridge. That is, the ink cartridge 30 of the disclosure need not be a cartridge for storing ink, but may be a cartridge for storing liquid to be consumed in the printer 10.

[Remarks]

The ink cartridge 30 is an example of a liquid cartridge. The housings 130 and 330 are an example of a housing. The first storage chamber 32 and the second storage chamber 33 are an example of a liquid storage chamber. The IC board 64 is an example of a circuit board. The electrodes 65 are an example of an electrode. The front edge 65F is an example of a front edge. The ink supply portion 34 is an example of a liquid supply portion. The ink supply port 71 is an example of an opening. The ink valve chamber 35 is an example of a liquid passage. The front end 63F is an example of a front end. The front end 63F is also an example of a frontmost point. The top wall 39 is an example of a top wall. The protrusion 43 is an example of a first protrusion. The rib 67 and the protrusion 391 are an example of a second protrusion. The front end 67F is an example of a front end of the second protrusion. The rear end 67R is an example of a rear end of the second protrusion. The horizontal surface 154 and the sloped surface 155 is an example of an upper surface of the first protrusion. The main upper surface 68, the sub upper surface 69, and the upper surface 391U are an example of an upper surface of the second protrusion. The imaginary planes 150 and 350 are an example of an imaginary plane. The boundary 156 is an example of a first point. The upper edge 67FU and the upper surface 391U is an example of a second point. The center point C2 is an example of a center point between the first point and the second point. the distance L1 is an example of a distance between the first point and the front edge of the electrode. The distance L2 is an example of the second point and the front edge of the electrode. The center point C1 is an example of a center point of the housing. The right protruding portion 43R is an example of a first protruding portion. The left protruding portion 43L is an example of a second protruding portion. The rear protruding portion 43B is an example of a third protruding portion. The rear surface 43BF is an example of an engaging surface. The lock shaft 145 is an example of a part of a cartridge case. The cartridge case 101 is an example of a cartridge case. The first main top wall 61 and the second main top wall 62 are an example of a first part of the top wall. The sub top wall 63 is an example of a second part of the top wall. The boundary 70 is an example of a boundary between the first part and the second part. The first main top wall 61 is an example of a forward region in the first part. The dimension D1 is an example of a first dimension. The main upper surface 68 is an example of a third part of the second protrusion. The sub upper surface 69 is an example of a fourth part of the second protrusion. The base 130B is an example of a base. The cover 134 is an example of a cover. The engaging pawls 88 are an example of a plurality of engaging pawls. The engaging holes 86 are an example of a plurality of engaging holes. The side walls 84 and 85 are an example of a peripheral wall. The front end 67F is an example of a front surface. The main upper surface 68 is an example of a main upper surface. The sub upper surface 69 is an example of a sub upper surface. The sloped surface 155 is an example of a sloped surface. The horizontal surface 154 is an example of a horizontal surface. The boundary 156 is an example of a boundary between the sloped surface and the horizontal surface. The walls 37, 38, 39, 40, 41, 42, 48, 82, 83, 84, and 85 are examples of a plurality of walls of the housing. The side walls 37 and 84, and 38 and 85 are examples of a pair of side walls. The front walls 40 and 82 are an example of a front wall. The rear walls 41 and 83 are an example of a rear wall. The main bottom wall 42 and the sub bottom wall 48 are an example of a bottom wall. The imaginary lines (the imaginary planes 150 and 350) are an example of an imaginary line. The rear wall 41 is also an example of a rear end. The frontward direction 51 is an example of a depth direction. The downward direction 53 is an example of a gravitational direction. The left-right direction is an example of a width direction. The upward direction 54 is an example of a height direction.

What is claimed is:

1. A liquid cartridge comprising:
a housing defining a liquid storage chamber therein;
a circuit board including an electrode; and
a liquid supply portion provided at the housing and defining therein a liquid passage extending frontward from the liquid storage chamber in a depth direction crossing a gravitational direction,
wherein the housing comprises:
a plurality of walls defining an outline of the liquid cartridge when viewed in a width direction crossing the gravitational direction and the depth direction, the plurality of walls comprising a top wall at which the circuit board is provided;
a first protrusion positioned rearward of the circuit board in the depth direction, the first protrusion protruding upward from the top wall;
a second protrusion positioned frontward of the circuit board in the depth direction, the second protrusion protruding upward from the top wall; and
a third protrusion positioned frontward of the circuit board and rearward of the second protrusion in the depth direction, the third protrusion protruding upward from the top wall,
wherein, when viewed in the width direction, the outline of the liquid cartridge is positioned lower than an imaginary line in a region in the depth direction between a first point defined on the outline of the first protrusion and a second point defined on the outline of the second protrusion, the imaginary line passing through each of the first point on the first protrusion and the second point on the second protrusion, the first protrusion and the second protrusion being below the imaginary line,
wherein the liquid supply portion has an opening open frontward in the depth direction, and
wherein the second point on the second protrusion is positioned frontward of the opening of the liquid supply portion in the depth direction.

2. The liquid cartridge according to claim 1,
wherein the first point on the first protrusion is positioned higher than the second point on the second protrusion, and
wherein a front edge of the electrode and the first point define a first distance in the depth direction therebetween that is smaller than a second distance in the depth direction between the front edge of the electrode and the second point.

3. The liquid cartridge according to claim 2,
wherein the second point on the second protrusion is positioned upward of an upper surface of the third protrusion.

4. The liquid cartridge according to claim 1,
wherein the second protrusion has a dimension in the depth direction that is smaller than a dimension in the depth direction of the third protrusion.

5. The liquid cartridge according to claim 4,
wherein the dimension in the depth direction of the second protrusion is smaller than a dimension thereof in the gravitational direction.

6. The liquid cartridge according to claim 1,
wherein the first protrusion has an upper surface including the first point, the upper surface of the first protrusion being positioned higher than an upper surface of the second protrusion,
wherein the upper surface of the first protrusion comprises:
a sloped surface sloped relative to the depth direction; and
a horizontal surface connected to the sloped surface and positioned rearward of the sloped surface in the depth direction, the horizontal surface extending in the depth direction, and
wherein the first point is on a boundary between the sloped surface and the horizontal surface.

7. The liquid cartridge according to claim 1,
wherein the plurality of walls further comprises:
a front wall having a frontmost point in the depth direction; and
a rear wall spaced away from the front wall in the depth direction, the rear wall having a rearmost point in the depth direction,
wherein the first point on the first protrusion is positioned closer to the rear wall of the housing than to the front wall of the housing in the depth direction, and
wherein the second point on the second protrusion is positioned closer to the front wall of the housing than to the rear wall of the housing in the depth direction.

8. The liquid cartridge according to claim 1,
wherein the first protrusion comprises:
a first protruding portion extending in the depth direction and having a rear end facing rearward in the depth direction;
a second protruding portion extending in the depth direction and having a rear end facing rearward in the depth direction, the second protruding portion being positioned to be spaced away from the first protruding portion in the width direction; and
a third protruding portion extending in the width direction and connecting the rear end of the first protruding portion and the rear end of the second protruding portion to each other, and
wherein the second protrusion has a dimension in the depth direction greater than dimensions thereof in the gravitational direction and the width direction.

9. The liquid cartridge according to claim 8, wherein the third protruding portion of the first protrusion has an engaging surface facing rearward in the depth direction for engagement with a part of a cartridge case in a state where the liquid cartridge is attached to the cartridge case.

10. The liquid cartridge according to claim 1, wherein the top wall of the housing comprises:

a first part extending in the depth direction; and a second part sloped relative to the depth direction to extend downward and frontward from the first part, wherein the first part and the second part define a boundary therebetween, and wherein the third protrusion extends across the boundary between the first part and the second part, and has a front end positioned on the second part.

11. The liquid cartridge according to claim 10, wherein the first part includes a frontward region positioned frontward of the circuit board in the depth direction, the frontward region of the first part and the second part defining a first dimension in the depth direction, and wherein the third protrusion has a dimension in the depth direction that is greater than a half of the first dimension in the depth direction.

12. The liquid cartridge according to claim 11, wherein the third protrusion comprises:

a third part extending in the depth direction and the width direction and having a front end in the depth direction; and a fourth part extending from the front end of the third part and sloped relative to the depth direction such that the fourth part is sloped downward and frontward.

13. The liquid cartridge according to claim 1, wherein the housing comprises:

a base defining the liquid storage chamber therein; and a cover in engagement with the base to cover an upper end of the base, the cover including the top wall and supporting the circuit board directly or indirectly.

14. The liquid cartridge according to claim 13, wherein the base comprises a plurality of engaging pawls for engagement with the cover, wherein the cover further comprises a peripheral wall extending downward from a periphery of the top wall, the peripheral wall being formed with a plurality of engaging holes each for receiving a corresponding one of the engaging pawls, and wherein the third protrusion has a front end positioned further frontward than any one of the engaging holes in engagement with the respective engaging pawls in the depth direction.

15. The liquid cartridge according to claim 14, wherein the third protrusion has a rear end positioned further rearward than one of the engaging holes that is positioned frontmost thereamong in the depth direction.

16. The liquid cartridge according to claim 1, wherein the third protrusion is plate-shaped and has:

a front surface extending from the top wall and facing frontward in the depth direction;

a main upper surface extending in the depth direction, the main upper surface facing upward; and a sub upper surface extending from the main upper surface and sloped relative to the depth direction, the sub upper surface being sloped downward and frontward, and wherein the front surface and the sub upper surface of the third protrusion define therebetween an upper edge.

17. The liquid cartridge according to claim 1, wherein the plurality of walls further comprises:

a front wall having a frontmost point in the depth direction; and a rear wall spaced away from the front wall in the depth direction, the rear wall having a rearmost point in the depth direction, and wherein, when viewed in the width direction, the outline of the liquid cartridge is positioned lower than the imaginary line in a region between the frontmost point of the front wall and the rearmost wall of the rear wall.

* * * * *